US008972988B2

(12) United States Patent
Ikegami et al.

(10) Patent No.: US 8,972,988 B2
(45) Date of Patent: Mar. 3, 2015

(54) REMOTE VIRTUAL MACHINE MIGRATION PORT MANAGEMENT DEVICE AND SYSTEM

(75) Inventors: Kozo Ikegami, Yokohama (JP); Takashi Yokoyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 272 days.

(21) Appl. No.: 13/553,656

(22) Filed: Jul. 19, 2012

(65) Prior Publication Data

US 2013/0185721 A1 Jul. 18, 2013

(30) Foreign Application Priority Data

Jul. 29, 2011 (JP) ................................. 2011-167104

(51) Int. Cl.
*G06F 9/455* (2006.01)
*G06F 15/173* (2006.01)
*G06F 7/00* (2006.01)

(52) U.S. Cl.
CPC ........ *G06F 9/45545* (2013.01); *G06F 9/45558* (2013.01); *G06F 2009/4557* (2013.01)
USPC ................ 718/1; 709/242; 707/781

(58) Field of Classification Search
None
See application file for complete search history.

(56) References Cited

U.S. PATENT DOCUMENTS

| 8,407,182 B1* | 3/2013 | Rajaa et al. | 707/610 |
|---|---|---|---|
| 2009/0025007 A1* | 1/2009 | Hara et al. | 718/105 |
| 2009/0037680 A1 | 2/2009 | Colbert et al. | |
| 2010/0165877 A1* | 7/2010 | Shukla et al. | 370/254 |
| 2012/0173757 A1* | 7/2012 | Sanden | 709/238 |

* cited by examiner

*Primary Examiner* — Lewis A Bullock, Jr.
*Assistant Examiner* — Jacob Dascomb
(74) *Attorney, Agent, or Firm* — Foley & Lardner LLP

(57) ABSTRACT

A live migration process between different locations is realized without migrating data stored in a storage area to another location. A network device, which is included in each of locations, for coupling to another one of the locations, the network device stores a program for realizing an access processing module for managing accesses, and coupling management information for managing a coupling relationship between the plurality of virtual machines and the plurality of storage areas, and wherein the access processing module is configured to: receive a notification to start a live migration process, refer to the coupling management information to identify a port for accessing a storage area allocated to a virtual machine; acquire an address of a transfer destination device to which an access request is transferred; generate conversion information; and control the access request based on the conversion information.

7 Claims, 36 Drawing Sheets

COUPLING MANAGEMENT TABLE

| SERVER_IF_ID | SERVER PORT | STORAGE PORT | LUN | STATE | BITMAP_ID |
|---|---|---|---|---|---|
| 1 | 0x200 | 0x310 | 0x400 | NO | — |
| 2 | 0x210 | 0x310 | 0x450 | NO | — |
| 1 | 0x220 | 0x320 | 0x410 | NO | — |
| ⋮ | ⋮ | ⋮ | ⋮ | ⋮ | ⋮ |

FIG. 5A

COUPLING MANAGEMENT TABLE

| SERVER_IF_ID | SERVER PORT | STORAGE PORT | LUN | STATE | BITMAP_ID |
|---|---|---|---|---|---|
| 1 | 0x100200 | 0x100311 | 0x500 | NO | — |
| ⋮ | ⋮ | ⋮ | ⋮ | ⋮ | ⋮ |

FIG. 5B

SERVER MANAGEMENT TABLE

| SERVER_IF_ID | SERVER_IP |
|---|---|
| 1 | 200.1.1.2 |
| 2 | 200.1.1.3 |
| ⋮ | ⋮ |

FIG. 7A

SERVER MANAGEMENT TABLE

| SERVER_IF_ID | SERVER_IP |
|---|---|
| 1 | 200.1.4.2 |
| ⋮ | ⋮ |

FIG. 7B

MONITORING TABLE

| SOURCE_IP | DESTINATION_IP | ATTRIBUTE |
|---|---|---|
| 200.1.1.2 | 200.1.4.2 | SOURCE |
| ⋮ | ⋮ | ⋮ |

MONITORING TABLE

| SOURCE_IP | DESTINATION_IP | ATTRIBUTE |
|---|---|---|
| 200.1.1.2 | 200.1.4.2 | DESTINATION |
| ⋮ | ⋮ | ⋮ |

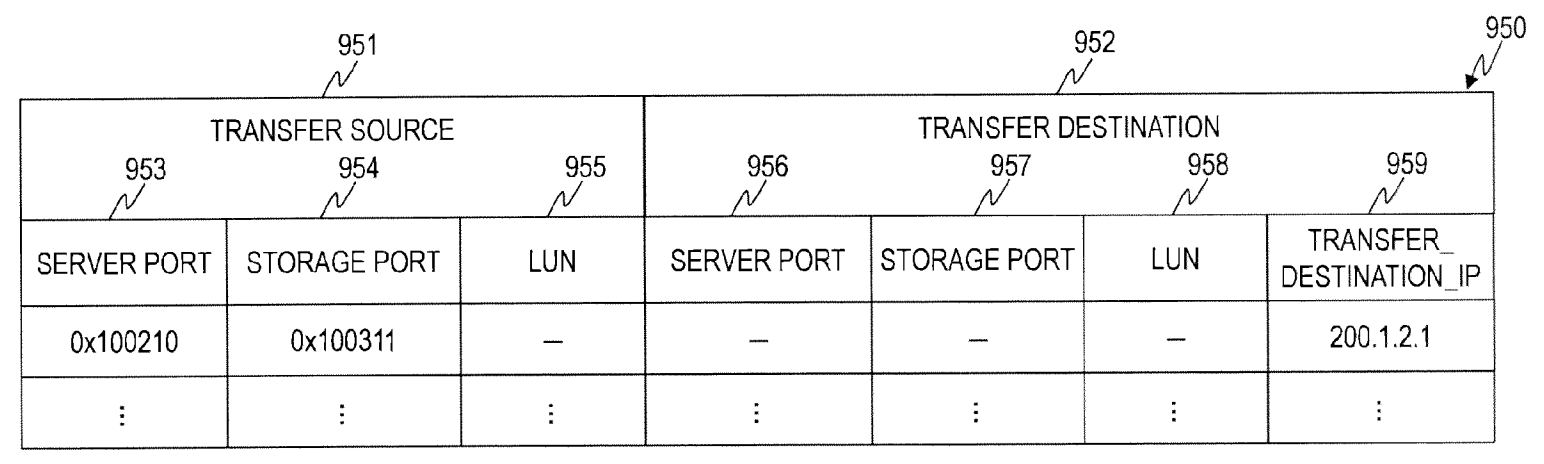

| 953 | TRANSFER SOURCE 954 | 955 | 956 | TRANSFER DESTINATION 957 | 958 | 959 |
|---|---|---|---|---|---|---|
| SERVER PORT | STORAGE PORT | LUN | SERVER PORT | STORAGE PORT | LUN | TRANSFER_DESTINATION_IP |
| 0x100210 | 0x100311 | — | — | — | — | 200.1.2.1 |
| ... | ... | ... | ... | ... | ... | ... |

FIG. 9

COUPLING MANAGEMENT TABLE

| SERVER_IF_ID | SERVER PORT | STORAGE PORT | LUN | STATE | BITMAP_ID |
|---|---|---|---|---|---|
| 1 | 0x200 | 0x310 | 0x400 | IN PROGRESS | — |
| 2 | 0x210 | 0x310 | 0x450 | NO | — |
| 1 | 0x220 | 0x320 | 0x410 | IN PROGRESS | — |
| ⋮ | ⋮ | ⋮ | ⋮ | ⋮ | ⋮ |

FIG. 17

| 950 | | | | | | |
|---|---|---|---|---|---|---|
| | TRANSFER SOURCE 951 | | | TRANSFER DESTINATION 952 | | |
| | SERVER PORT 953 | STORAGE PORT 954 | LUN 955 | SERVER PORT 956 | STORAGE PORT 957 | LUN 958 | TRANSFER_DESTINATION_IP 959 |
| | — | — | — | 0x100210 | 0x100311 | — | 200.1.3.1 |

FIG. 18

COUPLING MANAGEMENT TABLE

| SERVER_IF_ID | SERVER PORT | STORAGE PORT | LUN | STATE | BITMAP_ID |
|---|---|---|---|---|---|
| 1 | 0x200 | 0x310 | 0x400 | NO | — |
| 2 | 0x210 | 0x310 | 0x450 | NO | — |
| 1 | 0x220 | 0x320 | 0x410 | SOURCE | — |
| ⋮ | ⋮ | ⋮ | ⋮ | ⋮ | ⋮ |

FIG. 19

| TRANSFER SOURCE 951 | | | TRANSFER DESTINATION 952 | | | |
|---|---|---|---|---|---|---|
| SERVER PORT 953 | STORAGE PORT 954 | LUN 955 | SERVER PORT 956 | STORAGE PORT 957 | LUN 958 | TRANSFER_DESTINATION_IP 959 |
| 0x220 | 0x320 | 0x410 | 0x100210 | 0x100311 | — | 200.1.3.1 |

FIG. 20

COUPLING MANAGEMENT TABLE

| SERVER_IF_ID | SERVER PORT | STORAGE PORT | LUN | STATE | BITMAP_ID |
|---|---|---|---|---|---|
| 1 | 0x100200 | 0x100311 | 0x500 | NO | — |
| 1 | 0x100210 | 0x100311 | — | NO | — |
| ⋮ | ⋮ | ⋮ | ⋮ | ⋮ | ⋮ |

FIG. 22

COUPLING MANAGEMENT TABLE

| SERVER_IF_ID | SERVER PORT | STORAGE PORT | LUN | STATE | BITMAP_ID |
|---|---|---|---|---|---|
| 1 | 0x100200 | 0x100311 | 0x500 | NO | — |
| 1 | 0x100210 | 0x100311 | — | DESTINATION | 1 |
| ⋮ | ⋮ | ⋮ | ⋮ | ⋮ | ⋮ |

FIG. 23

| TRANSFER SOURCE 951 | | TRANSFER DESTINATION 952 | | |
|---|---|---|---|---|
| SERVER PORT 953 | STORAGE PORT 954 | LUN 955 | SERVER PORT 956 | STORAGE PORT 957 | LUN 958 | TRANSFER_DESTINATION_IP 959 |
| 0x100210 | 0x100311 | — | — | — | — | 200.1.2.1 |

FIG. 24

MONITORING TABLE

| SOURCE_IP (941) | DESTINATION_IP (942) | ATTRIBUTE (943) |
|---|---|---|
| 200.1.4.2 | 200.1.1.2 | SOURCE |
| ⋮ | ⋮ | ⋮ |

MONITORING TABLE

| SOURCE_IP (941) | DESTINATION_IP (942) | ATTRIBUTE (943) |
|---|---|---|
| 200.1.4.2 | 200.1.1.2 | DESTINATION |
| ⋮ | ⋮ | ⋮ |

REMOTE VIRTUAL MACHINE MIGRATION PORT MANAGEMENT DEVICE AND SYSTEM

CLAIM OF PRIORITY

The present application claims priority from Japanese patent application JP 2011-167104 filed on Jul. 29, 2011, the content of which is hereby incorporated by reference into this application.

BACKGROUND OF THE INVENTION

This invention relates to a network device and a network system, which realize a live migration process to a different computer between locations.

In recent years, in order to effectively utilize hardware resources of a server, a virtual machine technology for virtualizing hardware installed in the server and for operating a plurality of operating systems (OSs) by using the virtualized hardware has been put into practical use. In the virtual machine technology, computing resources, memory resources, and input/output (I/O) resources need to be managed and scheduled. A control program therefor is called hypervisor.

One of known functions of the hypervisor is live migration. The live migration may be used to migrate a virtual machine between servers without any interruption. This makes it possible to realize load balancing, aggregation of hardware resources, and server maintenance across the system without service suspension.

In order to realize the live migration, it is a precondition that a storage area can be shared by the migration source server and the migration destination server. This is because in the live migration, information on a virtual memory used by the virtual machine and register information are migrated but a storage area having a large capacity is not migrated. Therefore, it has been difficult to realize the live migration between the servers located in physically distant locations due to the precondition.

In order to solve the above-mentioned problem, it is conceivable to couple the locations by means of a dedicated high-speed line and synchronize the storage area of the migration source and the storage area of the migration destination. However, in this method, there is a need to secure a storage area in the location of the migration source and the location of the migration destination at all times. The method also has a disadvantage in that a load is always imposed on a network band between the locations, which results in an increased operation cost.

As a method for solving the above-mentioned problem, there is known a method described in US 2009/0037680, for example. In the method described in US 2009/0037680, means for migrating a storage area used by the virtual machine without any interruption is realized by the hypervisor. Specifically, after migrating data stored in the storage area in preprocessing of the live migration, the hypervisor executes the live migration, to thereby realize the migration without any interruption of the virtual machine between the locations.

SUMMARY OF THE INVENTION

However, in the method described in US 2009/0037680, when the storage area to be migrated is large, when an update frequency of the storage area is high, or when a distance between the locations are long and there is a significant network delay, it may take time to complete the migration of the storage area.

In a case where the storage migration takes time, there is a problem in that the live migration for the purpose of the load balancing cannot be executed. US 2009/0037680 has another problem in that a heavy load may be imposed on the migration source server because the hypervisor executes the migration of the storage area.

Further, in a case where the virtual machine is to be temporarily migrated to another location, all storage areas used by the virtual machine need to be migrated, which leads to a still another problem in that an unnecessary load is imposed on the network between the locations.

It is an object of this invention to provide a network system and a network device for executing live migration without migrating a storage area and without increasing loads on a hypervisor and a network.

A representative example of this invention is as follows. That is, a network device, which is included in each of locations, for coupling to another one of the locations. The each of the locations including: a computer having a first processor, a first memory coupled to the first processor, and a first interface coupled to the first processor; and a storage system having a controller, a plurality of storage media, and a second interface. The network device comprising a third processor, a third memory coupled to the third processor; a third interface coupled to the third processor, for coupling to the computer and the storage system, a fourth interface for coupling to the network device included in the another one of the locations. The storage system generates a plurality of storage areas to be allocated to a virtual machine. The first memory stores a program for realizing a virtualization module for allocating a physical resource of the computer to generate a plurality of virtual machines and managing each of the plurality of virtual machines. The virtualization module includes a live migration processing module for transmitting register information of the each of the plurality of virtual machines and information on a virtual memory allocated to the each of the plurality of virtual machines, to another computer to migrate at least one virtual machine. The third memory stores a program for realizing an access processing module for managing accesses between the plurality of virtual machines and the plurality of storage areas, and coupling management information for managing a coupling relationship between the plurality of virtual machines and the plurality of storage areas. The access processing module is configured to: receive a notification to start a live migration process for migrating a first virtual machine to a second computer included in a second location, from a first virtualization module executed on a first computer included in a first location; refer to the coupling management information to identify a port for accessing a first storage area which is generated by a first storage system included in the first location and is allocated to the first virtual machine; identify a port for accessing a second storage area, which is generated by a second storage system included in the second location and is allocated to the first virtual machine; acquire an address of a transfer destination device to which an access request is transferred, the access request being transmitted from the first virtual machine; associate the port for accessing the first storage area, the port for accessing the second storage area, and the address of the transfer destination device to which the access request is transferred with one another to generate conversion information; and control the access request, which is transmitted from the first virtual machine after the live migration process is executed, based on the conversion information.

According to the exemplary embodiment of this invention, the live migration process between the computers located in the physically distant locations may be realized. Also, the access request from the migrated virtual machine may be transferred to the storage area of the migration source based on the conversion information. In this manner, the virtual machine may be migrated in a short period of time, and the loads on the network and the virtualization module may be reduced. Further, the virtual machine of the migration destination is allowed to access the storage of the migration source.

BRIEF DESCRIPTION OF THE DRAWINGS

The present invention can be appreciated by the description which follows in conjunction with the following figures, wherein:

FIGS. 5A and 5B are explanatory diagrams illustrating examples of a coupling management table according to the embodiment of this invention;

FIGS. 7A and 7B are explanatory diagrams illustrating examples of a server management table according to the embodiment of this invention;

FIGS. 8A and 8B are explanatory diagrams illustrating examples of a monitoring table according to the embodiment of this invention;

FIG. 9 is an explanatory diagram illustrating an example of a conversion table according to the embodiment of this invention;

FIG. 17 illustrates a state of the coupling management table after the completion of a processing of Step S403;

FIG. 18 illustrates a state of the conversion table after the completion of a processing of Step S405;

FIG. 19 illustrates a state of the coupling management table after completion of a processing of Step S408;

FIG. 20 illustrates a state of the conversion table after the completion of a processing of Step S409;

FIG. 22 illustrates a state of the coupling management table after the completion of a processing of Step S423;

FIG. 23 illustrates a state of the coupling management table after the completion of a processing of Step S425;

FIG. 24 illustrates a state of the conversion table after the completion of a processing of Step S426;

FIG. 32 illustrates a state of the monitoring table after the completion of a processing of Step S902;

FIG. 34 illustrates a state of the monitoring table after the completion of a processing of Step S922.

DETAILED DESCRIPTION OF THE PREFERRED EMBODIMENT

Hereinafter, an embodiment of this invention is described with reference to the accompanying drawings.

In the embodiment of this invention, a case where a virtual machine is to be migrated between two locations is described. Specifically, a case where a virtual machine operating on a server located in an arbitrary location is migrated to a server located in another location, and then the virtual machine is migrated back to the original server is described. It should be noted that hereinafter, the virtual machine is referred to as VM.

Figure 1:
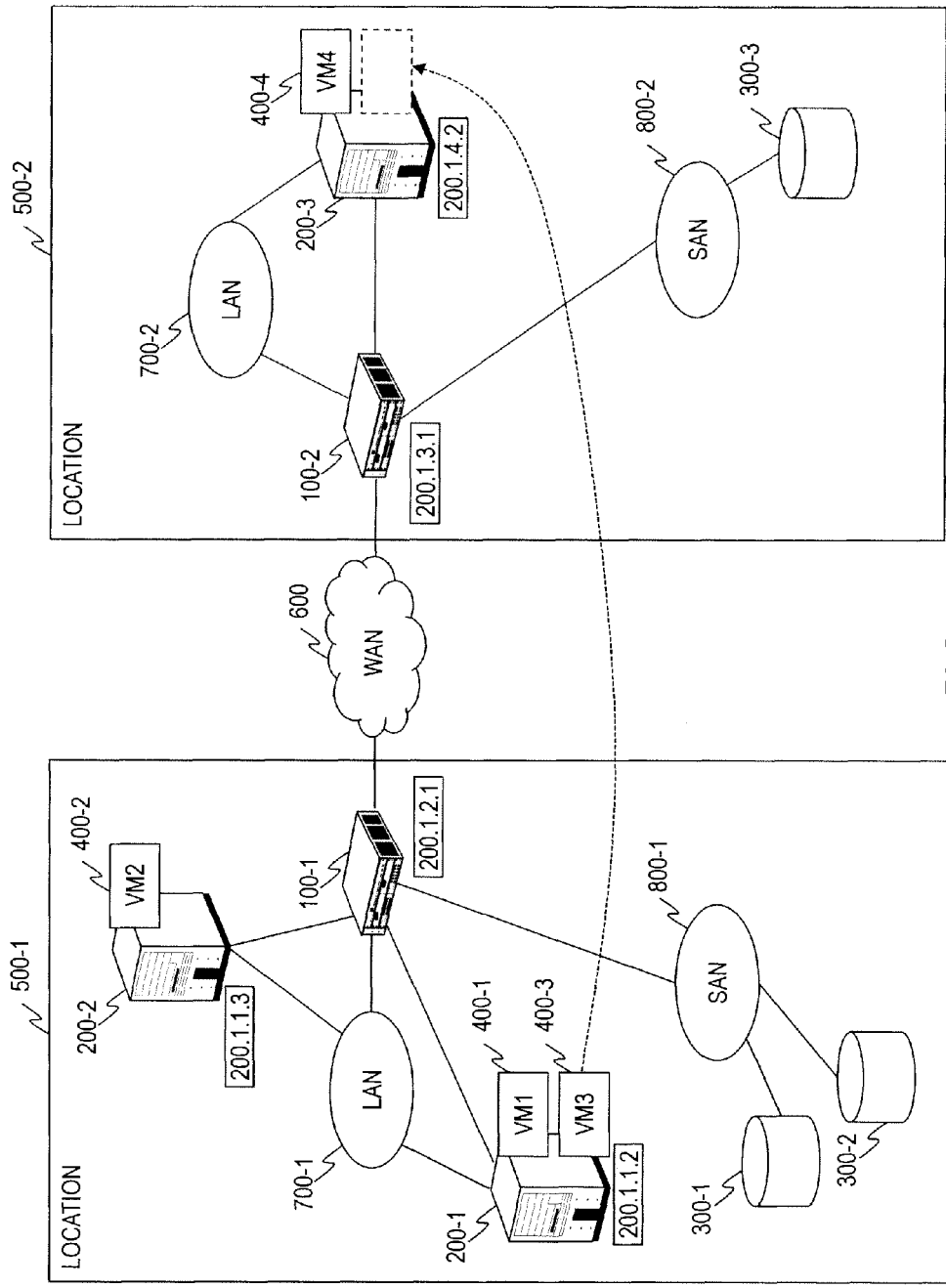
FIG. 1 is an explanatory diagram illustrating a configuration example of a network system according to the embodiment of this invention.

FIG. 1 is an explanatory diagram illustrating a configuration example of a network system according to the embodiment of this invention.

The network system includes a plurality of locations. In the example illustrated in FIG. 1, the network system includes two locations 500-1 and 500-2. The location 500-1 and the location 500-2 are coupled via a wide area network (WAN) 600. Hereinafter, the location 500-1 and the location 500-2 may be referred to as locations 500 where no distinction is made therebetween.

The location 500-1 includes a server 200-1, a server 200-2, a network device 100-1, a storage 300-1, and a storage 300-2. A VM 1 (400-1) and a VM 3 (400-3) are operating on the server 200-1, and a VM 2 (400-2) is operating on the server 200-2.

Similarly, the location 500-2 includes a server 200-3, a network device 100-2, and a storage 300-3. A VM 4(400-4) is operating on the server 200-3.

Hereinafter, the server 200-1, the server 200-2, and server 200-3 are referred to as servers 200 where no distinction is made thereamong. The network device 100-1 and the network device 100-2 are referred to as network devices 100 where no distinction is made therebetween. The storage 300-1, the storage 300-2, and the storage 300-3 are referred to as storages 300 where no distinction is made thereamong. Further, the VM 400-1, the VM 400-2, the VM 400-3, and the VM 400-4 are referred to as VMs 400 where no distinction is made thereamong.

The network device 100 manages communication within the location 500. The network devices 100 also couple the locations 500 with each other. It should be noted that a configuration of the network device 100 is described later with reference to FIG. 2.

The server 200 includes a hypervisor 250 (see FIG. 3) for generating the VMs 400 and for managing the VMs 400. The hypervisor 250 uses N Port ID Virtualization (NPIV) to execute a fabric login for each VM 400. This allows the VMs 400 to access the storages 300. It should be noted that a configuration of the server 200 is described later with reference to FIG. 3.

The storage 300 is a storage medium for providing a storage area to be used by the server 200. The storage 300 includes a hard disk drive (HDD) or a solid state drive (SSD), for example. The storage 300 is logically divided into a plurality of storage areas, and each of the storage areas is managed as a logical unit. It should be noted that the logical unit is given a logical unit number as an identifier.

In an example illustrated in FIG. 1, the server 200-1 and the server 200-2 are coupled to each other via a local area network (LAN) 700-1. The network device 100-1 is also coupled to the LAN 700-1 to relay communication between the servers 200 in the locations 500.

The server 200-1 and the server 200-2 are directly coupled to the network device 100-1 to access the storage 300-1 and the storage 300-2 via the network device 100-1.

The storage 300-1 and the storage 300-2 are coupled to the network device 100-1 via a storage area network (SAN) 800-1. It should be noted that the SAN 800-1 includes at least one fiber channel switch (not shown).

Each of the server 200-1, the server 200-2, and the network device 100-1 is assigned a global IP address. Specifically, the server 200-1 is assigned an IP address "200.1.1.2", the server 200-2 is assigned an IP address "200.1.1.3", and the network device 100-1 is assigned an IP address "200.1.2.1".

The hypervisor 250 on the server 200 uses N Port ID Virtualization (NPIV) to execute a login process for each VM 400 (fabric login) and acquire a port address of each VM 400.

It should be noted that the location 500-2 has a configuration similar to that of the location 500-1, and therefore a description thereof is omitted.

In this embodiment, processing of migrating the VM 3 (400-3) operating on the server 200-1 in the location 500-1 to the server 200-3 in the location 500-2 and then migrating the VM 3 (400-3) back to the server 200-1 is described.

It should be noted that in this embodiment, the server 200 and the network device 100 communicate to/from each other by using the Internet Protocol (IP), and the storages 300 communicate to/from each other by using the Fiber Channel Protocol (FCP).

In a case where storage data is transmitted and received between the network devices 100, the communication is performed by using the Fiber Channel over Internet Protocol (FCIP).

It should be noted that the communication methods in the network system are merely examples, and any protocol may be employed as long as the devices can communicate to/from each other.

Figure 2:
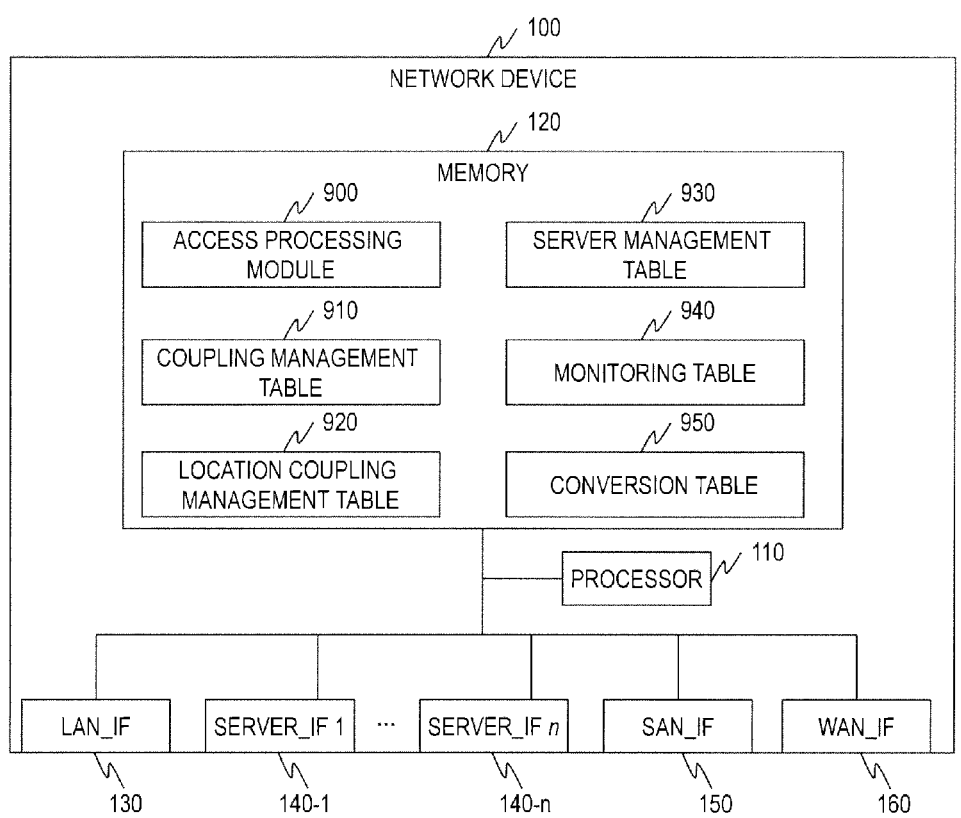
FIG. 2 is a block diagram illustrating an example of a hardware configuration and a software configuration of a network device according to the embodiment of this invention.

FIG. 2 is a block diagram illustrating an example of a hardware configuration and a software configuration of the network device 100 according to the embodiment of this invention.

The network device 100 includes a processor 110, a memory 120, a LAN_IF 130, server_IFs 140-1 to 140-*n*, a SAN_IF 150, and a WAN_IF 160.

The processor 110 executes a program stored in the memory 120. Functions of the network device 100 may be realized by the processor 110 executing the program.

The memory 120 stores the program executed by the processor 110 and information necessary for executing the program.

The memory 120 in this embodiment includes an access processing module 900, a coupling management table 910, a location coupling management table 920, a server management table 930, a monitoring table 940, and a conversion table 950. It should be noted that the memory 120 may include other programs and tables.

The access processing module 900 manages accesses between the VM 400 and the storage 300 in a live migration process. In the live migration process, register information of the VM 400 and information on the VM 400 stored on the memory 220 are to be migrated.

The coupling management table 910 stores information for managing coupling between the server 200 and the storage 300. It should be noted that details of the coupling management table 910 are described later with reference to FIGS. 5A and 5B.

The location coupling management table 920 stores information for managing coupling destinations of the network device 100 and the server 200 in another location 500. It should be noted that details of the location coupling management table 920 are described later with reference to FIGS. 6A and 6B.

The server management table 930 stores information for managing coupling between the network device 100 and the server 200. It should be noted that details of the server management table 930 are described later with reference to FIGS. 7A and 7B.

The monitoring table 940 stores information for filtering frames and packets. It should be noted that details of the monitoring table 940 are described later with reference to FIGS. 8A and 8B.

The conversion table 950 stores information for transferring the filtered frames and packets. It should be noted that details of the conversion table 950 are described later with reference to FIG. 9.

The memory 120 stores, in addition to the above-mentioned tables, bit maps corresponding to blocks of the logical units in order to manage accesses to the logical units. The bit maps are created temporarily, and an identifier for uniquely identifying each bit map is given to each bit map.

It should be noted that the memory 120 includes a switch processing module for executing processing of transferring frames and IP packets and processing of converting the frames and IP packets. However, the switch processing module is omitted because the switch processing module is not directly related to this invention.

The LAN_IF 130 is an interface for coupling to the LAN 700. The server_IFs 140-1 to 140-n are interfaces for coupling to the servers 200.

The SAN_IF 150 is an interface for coupling to the SAN 800. The WAN_IF 160 is an interface for coupling to the WAN 600.

It should be noted that the network device 100 may include other hardware, such as a control interface for coupling to a management network for managing the locations 500.

It should be noted that in this embodiment, the access processing module 900 is realized by executing a program, but functions of the access processing module 900 may be realized by using hardware such as an application specific integrated circuit (ASIC) or a field programmable gate array (FPGA).

Figure 3:
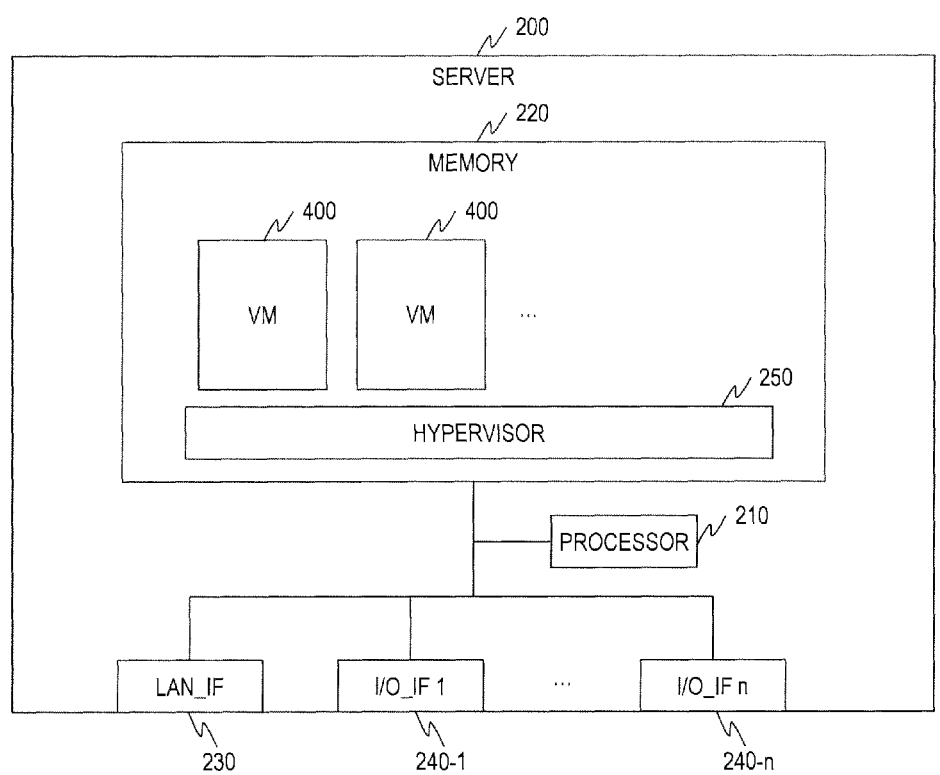
FIG. 3 is a block diagram illustrating an example of a hardware configuration and a software configuration of a server according to the embodiment of this invention.

FIG. 3 is a block diagram illustrating an example of a hardware configuration and a software configuration of the server 200 according to the embodiment of this invention.

The server 200 includes a processor 210, a memory 220, a LAN_IF 230, and IO_IFs 240-1 to 240-n.

The processor 210 executes a program stored in the memory 220. Functions of the server 200 may be realized by the processor 210 executing the program.

The memory 220 stores the program executed by the processor 210 and information necessary for executing the program. The memory 220 in this embodiment stores the hypervisor 250.

The hypervisor 250 generates the VM 400 by allocating a physical resource of the server 200 and manages the generated VM 400. The VM 400 executes various tasks. On the VM 400, an OS (not shown) and an application program (not shown) are executed. Further, the hypervisor 250 has a live migration function for executing the live migration process.

The LAN_IF 230 is an interface for coupling to the LAN 700. The IO_IFs 240-1 to 240-n are interfaces for coupling to the network devices 100 or other external devices.

Figure 4:
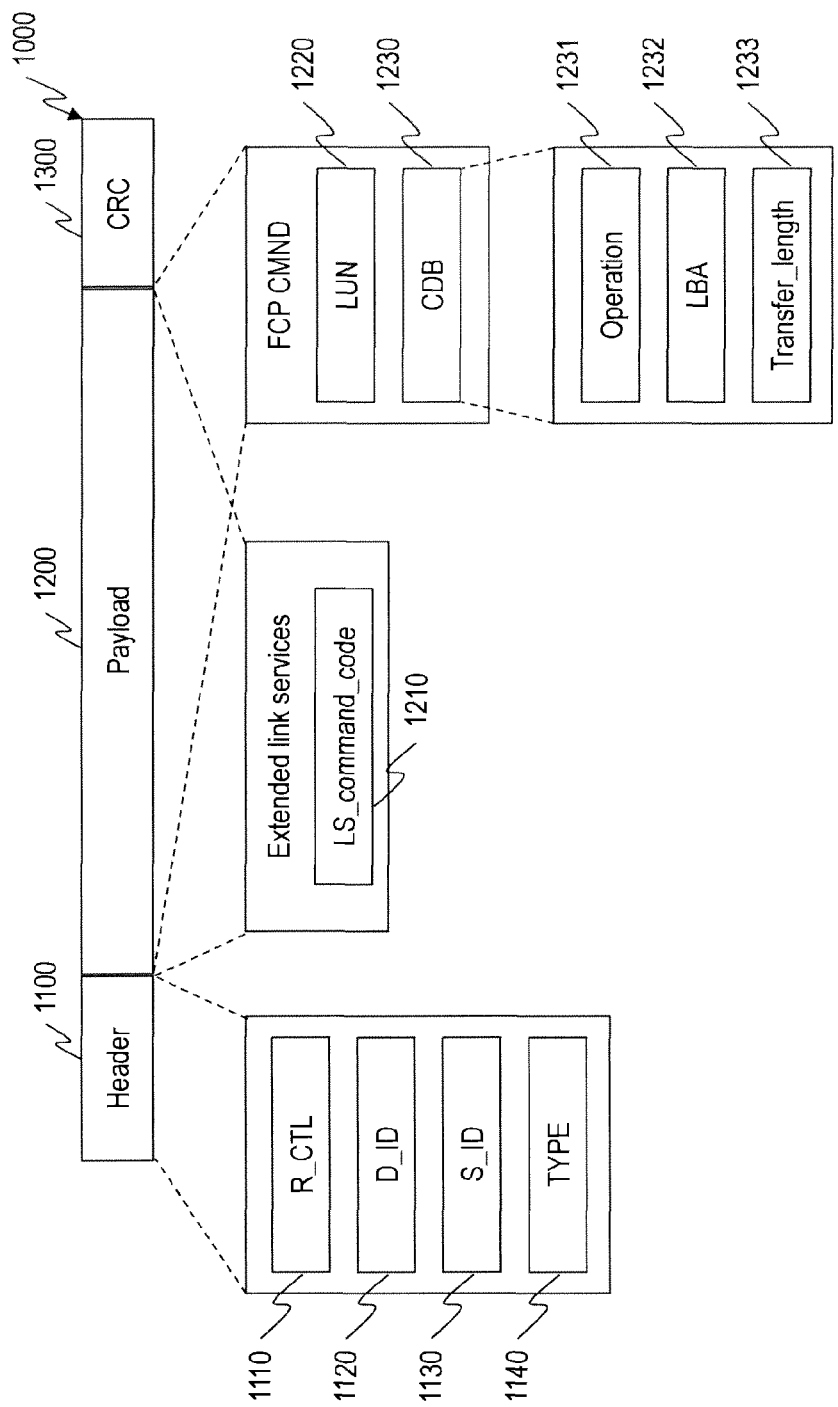
FIG. 4 is an explanatory diagram illustrating an example of a structure of an FC frame according to the embodiment of this invention.

FIG. 4 is an explanatory diagram illustrating an example of a structure of an FC frame according to the embodiment of this invention.

A fiber channel (FC) frame 1000 includes a header 1100, a payload 1200, and a cyclic redundancy check (CRC) 1300.

The header 1100 mainly stores information used for a transfer control. Specifically, the header 1100 stores an R_CTL 1110, a D_ID 1120, an S_ID 1130, and a type 1140.

The R_CTL 1110 stores a frame type. The D_ID 1120 stores a port address of a recipient. The S_ID 1130 stores a port address of a sender. The type 1140 stores information indicating the type of data stored in the payload 1200.

The payload 1200 stores contents of the main body of the data. The CRC 1300 stores redundant information for error detection for each frame.

In the case of extended link services in which the FC frame 1000 is used to transmit/receive port information, the R_CTL 1110 stores "0x22" and the type 1140 stores "0x01".

An LS_command_code 1210, which is stored in the payload 1200, stores "0x04" in a case of a fabric login (FLOGI) frame, "0x03" in a case of a port login (PLOGI) frame, "0x05" in a case of a port logout (PLOGO) frame, "0x02" in a case of an accept (ACC) frame, or "0x01" in a case of a reject (RJT) frame.

In a case where the FC frame 1000 is a Small Computer System Interface (SCSI) command frame of FC-4, the R_CTL 1110 stores "0x06" in a case of an FCP_CMND frame, "0x05" in a case of an FCP_XFER_RDY frame, "0x01" in a case of an FCP_DATA frame, or "0x07" in a case of an FCP_RSP frame. It should be noted that the type 1140 stores "0x08" in all cases.

The FCP_CMND frame stores an LUN 1220 indicating the logical unit number and a command descriptor block (CDB) 1230.

In this example, the CDB 1230 includes an operation 1231 indicating an instruction, an LBA 1232 indicating a logical block address, and a transfer_length 1233 indicating a length of a block to be transferred. For example, when the operation 1231 stores "0x28", "0xA8", "0x88", or "0x7F", it indicates a read-type command, and when the operation 1231 stores "0x0A", "0x2A", "0xAA", or "0x8A", it indicates a write-type command.

FIGS. 5A and 5B are explanatory diagrams illustrating examples of the coupling management table 910 according to the embodiment of this invention.

FIG. 5A illustrates the coupling management table 910 held by the network device 100-1. FIG. 5B illustrates the coupling management table 910 held by the network device 100-2.

The coupling management table 910 is a table for managing a coupling state between the server 200 and the storage 300. The coupling management table 910 includes a server_I-F_ID 911, a server port 912, a storage port 913, an LUN 914, a state 915, and a bitmap_ID 916.

The server_IF_ID 911 stores an identifier of the server_IF 140.

The server port 912 stores an identification number of the server port allocated to the VM 400. It should be noted that the VM 400 is a VM 400 operating on the server 200 coupled to the server_IF 140 corresponding to the server_IF_ID 911. In this embodiment, the server port 912 serves as an identifier of the VM 400.

The storage port 913 stores an identification number of the storage port allocated to the VM 400. It should be noted that the VM 400 is a VM 400 operating on the server 200 coupled to the server_IF 140 corresponding to the server_IF_ID 911. The VM 400 accesses a logical unit (LU) by using the allocated storage port.

The LUN 914 stores an identification number of the logical unit accessed by the VM 400. The VM 400 is a VM 400 operating on the server 200 coupled to the server_IF 140 corresponding to the server_IF_ID 911.

The state 915 stores information indicating a state of the live migration process. Specifically, the state 915 stores any one of "no", "in progress", "source", or "destination". It should be noted that the state 915 stores "no" at the time when an entry is created.

The state "no" indicates that the live migration process is not executed. The state "in progress" indicates that the live migration process is in progress.

The state "source" indicates that the live migration process has been completed with the VM 400 being the migration source. The state "destination" indicates that the live migration process has been completed with the VM 400 being the migration destination.

The bitmap_ID 916 stores an identifier of a bit map for managing an access state of the logical unit accessed by the VM 400. It should be noted that when the live migration process is not executed, the bitmap_ID 916 stores nothing.

Figure 6A:
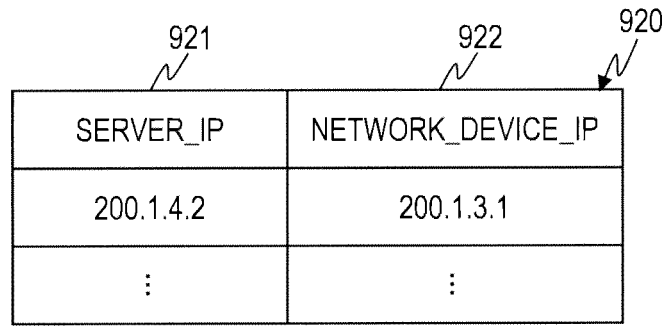
FIGS. 6A and 6B illustrate explanatory diagrams illustrating examples of a location coupling management table according to the embodiment of this invention.
Figure 6B:
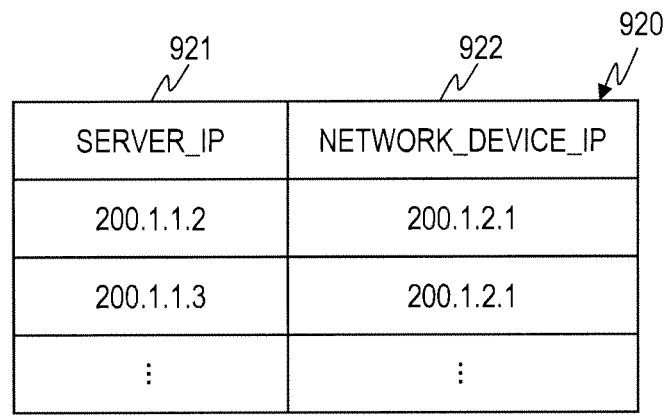

FIGS. 6A and 6B illustrate explanatory diagrams illustrating examples of the location coupling management table 920 according to the embodiment of this invention.

FIG. 6A illustrates the location coupling management table 920 held by the network device 100-1. FIG. 6B illustrates the location coupling management table 920 held by the network device 100-2.

The location coupling management table 920 is a table for managing the servers 200, which are candidates for the migration destination. Information set in the location coupling management table 920 is set in advance by an administrator. It should be noted that the network device 100 may acquire necessary information from the network and generate the location coupling management table 920 based on the acquired information.

The location coupling management table 920 includes a server_IP 921 and a network_device_IP 922.

The server_IP 921 stores the IP addresses of the servers 200 coupled to the network device 100 in the location of the migration destination. The network_device_IP 922 stores the IP address of the network device 100 at the migration destination.

In this embodiment, the server 200-3 coupled to the network device 100-2 is specified as the migration destination of the VM 400 operating on the server 200-1. Similarly, the server 200-1 and the server 200-2 coupled to the network device 100-1 are specified as the migration destinations of the VM 400 operating on the server 200-3 coupled to the network device 100-2.

Therefore, the location coupling management table 920 illustrated in FIG. 6A stores IP addresses of the network device 100-2 and the server 200-3. Similarly, the location coupling management table 920 illustrated in FIG. 6B stores the IP addresses of the network device 100-1, the server 200-1, and the server 200-2.

FIGS. 7A and 7B are explanatory diagrams illustrating examples of the server management table 930 according to the embodiment of this invention.

FIG. 7A illustrates the server management table 930 held by the network device 100-1. FIG. 7B illustrates the server management table 930 held by the network device 100-2.

The server management table 930 is a table for managing a coupling relationship between the server_IF 140 and the server 200. The server management table 930 includes a server_IF_ID 931 and a server_IP 932.

The server_IF_ID 931 stores an identifier of the server_IF 140.

The server_IP 932 stores the IP address of the server 200 coupled to the server_IF 140 corresponding to the server_IF_ID 931.

FIGS. 8A and 8B are explanatory diagrams illustrating examples of the monitoring table 940 according to the embodiment of this invention.

FIG. 8A illustrates the monitoring table 940 held by the network device 100-1. FIG. 8B illustrates the monitoring table 940 held by the network device 100-2.

The monitoring table 940 is a table for understanding the servers 200 subjected to the live migration process. The monitoring table 940 includes a source_IP 941, a destination_IP 942, and an attribute 943.

The source_IP 941 stores the IP address of the server 200 as the migration source. The destination_IP 942 stores the IP address of the server 200 as the migration destination.

The attribute 943 stores information indicating an attribute of the network device 100 that holds the monitoring table 940. The attribute is information indicating which of the location 500 of the migration source and the location 500 of the migration destination the network device 100 managing the monitoring table 940 belongs to. Specifically, the attribute 943 stores "source", which indicates the location 500 of the migration source, or "destination", which indicates the location 500 of the migration destination.

FIG. 9 is an explanatory diagram illustrating an example of the conversion table 950 according to the embodiment of this invention.

A transfer source 951 stores information for identifying a frame and IP packet transmitted from the own location 500.

The conversion table 950 includes the transfer source 951 and a transfer destination 952.

The transfer source 951 stores information for identifying the VM 400 of the transfer source. Specifically, the transfer source 951 includes a server port 953, a storage port 954, and an LUN 955.

The server port 953 is the same as the server port 912, the storage port 954 is the same as the storage port 913, and the LUN 955 is the same as the LUN 914. Therefore, descriptions thereof are omitted.

The transfer destination 952 stores information on the other location 500 to which the IP packet is transferred. The transfer destination 952 includes a server port 956, a storage port 957, an LUN 958, and a transfer_destination_IP 959.

The server port 956 is the same as the server port 912, the storage port 957 is the same as the storage port 913, and the LUN 958 is the same as the LUN 914. Therefore, descriptions thereof are omitted.

The transfer_destination_IP 959 stores the IP address of the network device 100 included in the other location 500.

(Before Execution of Live Migration Process)

First, operation of the network system before executing the live migration process is described.

Figure 10:
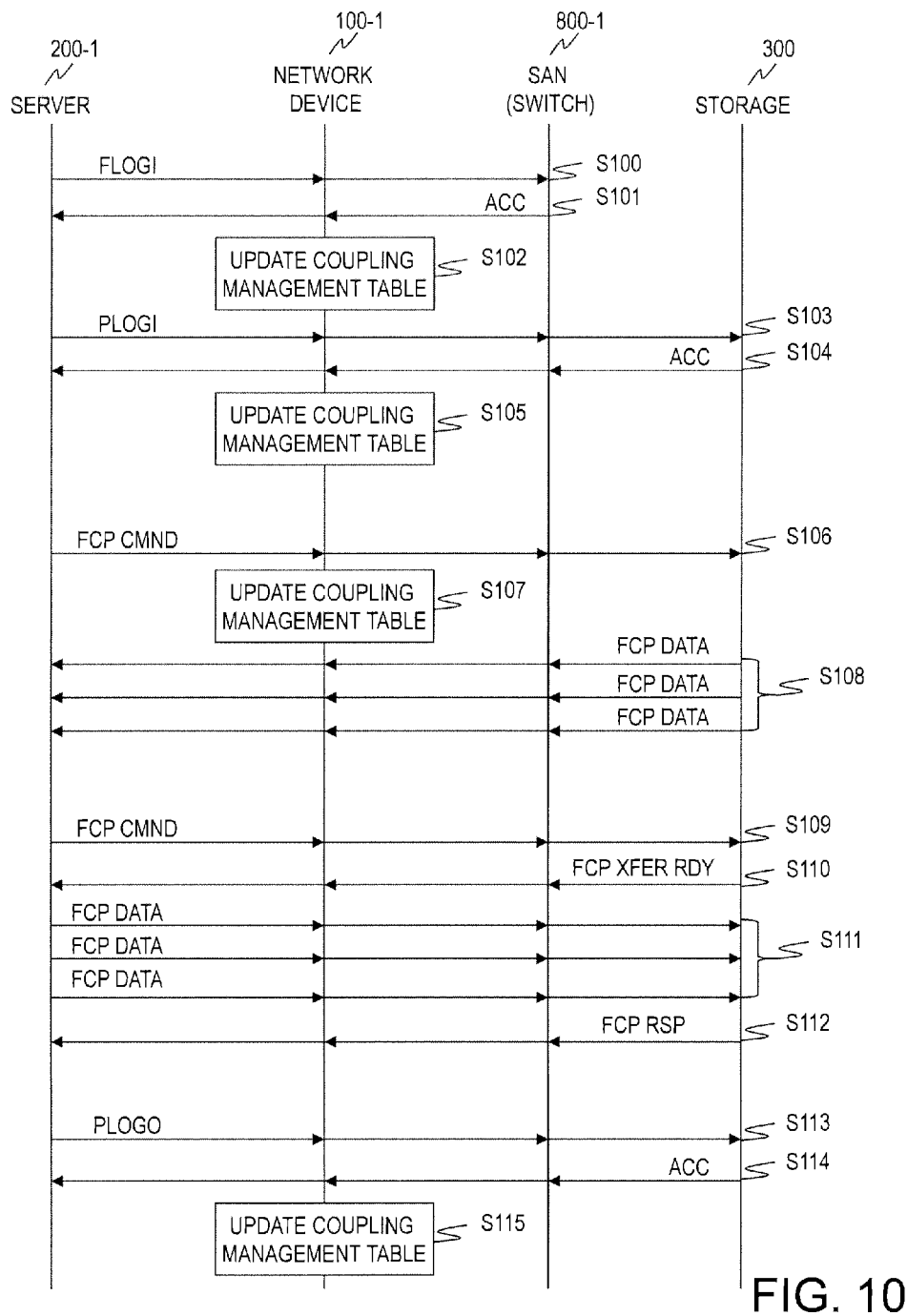
FIG. 10 is a sequence chart illustrating a processing flow before execution of a live migration process according to the embodiment of this invention.

FIG. 10 is a sequence chart illustrating a processing flow before execution of the live migration process according to the embodiment of this invention.

In FIG. 10, the processing in the server 200-1 in the location 500-1 is described as an example. Hereinafter, when the description is made with the server 200-1 being the subject, it is indicated that the hypervisor 250 of the server 200-1 executes the processing.

Processing of Steps S100 to S105 is the login process. Processing of Steps S106 to S108 is read processing. Processing of Steps S109 to S112 is write processing. Processing of Steps S113 to S115 is a logout process.

First, the server 200-1 executes the login process for the VM 1 (400-1) operating on the server 200-1 to access the storage 300.

The server 200-1 transmits an FLOGI frame to the SAN 800-1 in order to log in the storage 300 coupled to the SAN 800-1 (Step S100). Through this processing, an address of the server port is acquired.

The network device 100-1 transfers the received FLOGI frame to a switch included in the SAN 800-1.

In a case of receiving the FLOGI frame, the switch included in the SAN 800-1 transmits an ACC frame to the server 200-1 (Step S101). The ACC frame is a frame indicating that the login has been received.

The network device 100-1 transfers the received ACC frame to the server 200-1. At this time, the network device 100-1 updates the coupling management table 910 (Step S102). The update processing is described in detail later with reference to FIG. 11.

Then, the server 200-1 transmits a PLOGI frame to the storage 300 in order to acquire an address of the storage port to be accessed (Step S103).

The network device 100-1 transfers the received PLOGI frame to the switch included in the SAN 800-1. Further, the switch included in the SAN 800-1 transfers the received PLOGI frame to the storage 300.

In a case of receiving the PLOGI frame, the storage 300 transmits an ACC frame to the server 200-1 (Step S104). The ACC frame is a frame indicating that the login has been received.

In a case of receiving the ACC frame, the switch included in the SAN 800-1 transfers the ACC frame to the network device 100-1.

Further, in a case of receiving the ACC frame, the network device 100-1 transfers the frame to the server 200-1. At this time, the network device 100-1 that has received the PLOGI frame updates the coupling management table 910 (Step S105). The update processing is described in detail later with reference to FIG. 12.

Through the above-mentioned processing, necessary information is stored in the coupling management table 910. Therefore, by referring to the coupling management table 910, the network device 100-1 can understand which storage 300 the VM 400 accesses.

Next, the read processing is described.

The server 200-1 transmits an FCP_CMND frame which instructs to read a data to the storage 300 (Step S106).

In a case of receiving the FCP_CMND frame, the network device 100-1 transfers the frame to the switch included in the SAN 800-1. At this time, the network device 100-1 updates the coupling management table 910 (Step S107). The update processing is described in detail later with reference to FIG. 13.

In a case of receiving the FCP_CMND frame, the switch included in the SAN 800-1 transfers the frame to the storage 300.

In a case of receiving the FCP_CMND frame, the storage 300 reads predetermined data and transmits FCP_DATA frames including the read data to the server 200-1 (Step S108).

In a case of receiving the FCP_DATA frames, the switch included in the SAN 800-1 transfers the frames to the network device 100-1. Further, in a case of receiving the FCP_DATA frames, the network device 100-1 transfers the frames to the server 200-1.

Next, the write processing is described.

The server 200-1 transmits an FCP_CMND frame which instructs to write a data to the storage 300 (Step S109).

In a case of receiving the FCP_CMND frame, the network device 100-1 transfers the frame to the switch included in the SAN 800-1. Further, in a case of receiving the FCP_CMND frame, the switch included in the SAN 800-1 transfers the frame to the storage 300.

In a case of receiving the FCP_CMND frame, the storage 300 transmits an FCP_XFER_RDY frame indicating that the storage 300 is ready to receive a request to write data to the server 200-1 (Step S110).

In a case of receiving the FCP_XFER_RDY frame, the switch included in the SAN 800-1 transfers the frame to the network device 100-1. Further, when receiving the FCP_XFER_RDY frame, the network device 100-1 transfers the frame to the server 200-1.

In a case of receiving the FCP_XFER_RDY frame, the server 200-1 transmits FCP_DATA frames including write data to the storage 300 (Step S111).

In a case of receiving the FCP_DATA frames, the network device 100-1 transfers the frames to the switch included in the SAN 800-1. Further, in a case of receiving the FCP_DATA frames, the switch included in the SAN 800-1 transfers the frames to the storage 300.

In a case of receiving all the FCP_DATA frames transmitted from the server 200-1, the storage 300 transmits to the server 200-1 an FCP_RSP frame indicating that data is successfully written (Step S112).

In a case of receiving the FCP_RSP frame, the switch included in the SAN 800-1 transfers the frame to the network device 100-1. Further, in a case of receiving the FCP_RSP frame, the network device 100-1 transfers the frame to the server 200-1.

Next, the logout process is described.

The server 200-1 transmits a PLOGO frame indicating a port logout to the storage 300 (Step S113).

In a case of receiving the PLOGO frame, the network device 100-1 transfers the frame to the switch included in the SAN 800-1. Further, in a case of receiving the PLOGO frame, the switch included in the SAN 800-1 transfers the frame to the storage 300.

In a case of receiving the PLOGO frame, the storage 300 transmits an ACC frame indicating that the logout is complete to the server 200-1 (Step S114).

In a case of receiving the ACC frame, the switch included in the SAN 800-1 transfers the frame to the network device 100-1. Further, in a case of receiving the ACC frame, the network device 100-1 transfers the frame to the server 200-1.

At this time, the network device 100-1 updates the coupling management table 910 (Step S115). It should be noted that the update processing is described in detail later with reference to FIG. 14.

Next, processing of the network device 100 is described.

Figure 11:
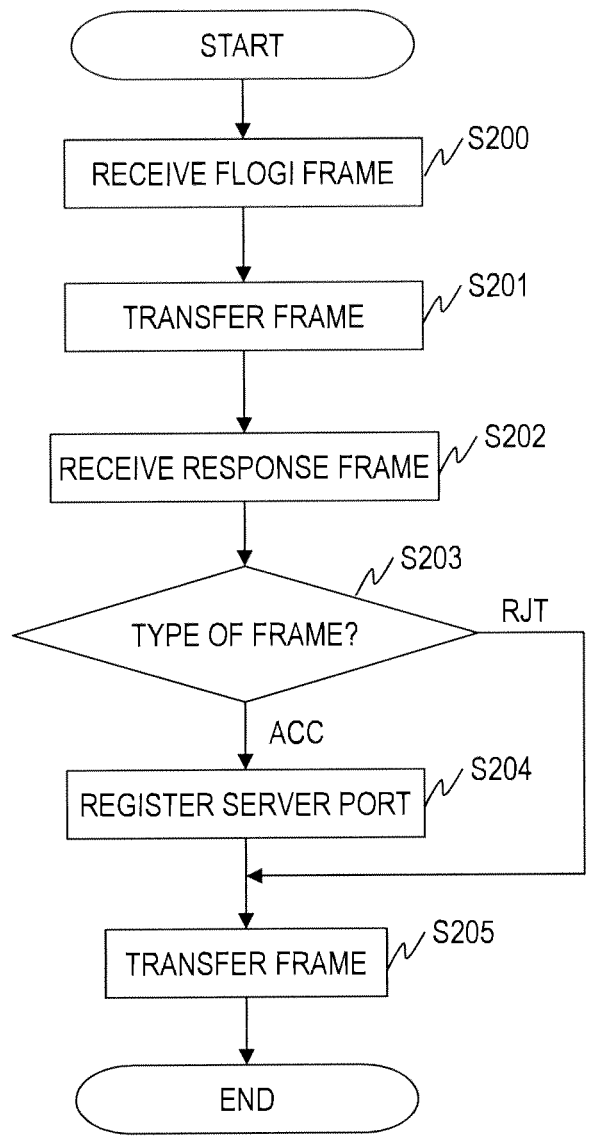
FIG. 11 is a flow chart illustrating processing executed by the network device according to the embodiment of this invention.

FIG. 11 is a flow chart illustrating processing executed by the network device 100-1 according to the embodiment of this invention. FIG. 11 illustrates the processing of the network device 100-1 that has received the FLOGI frame.

In a case of receiving the FLOGI frame from the server 200-1 (Step S200), the network device 100-1 transfers the frame to the switch included in the SAN 800-1 (Step S201). The network device 100-1 may judge whether or not the received frame is the FLOGI frame by referring to the R_CTL 1110, the type 1140, and the payload 1200 of the frame.

Hereinafter, the processing is executed by using a similar method, and therefore a description of the frame judgment processing is omitted.

After transferring the FLOGI frame, the network device 100-1 waits for a response frame transmitted from the switch included in the SAN 800-1.

In a case of receiving the response frame from the switch included in the SAN 800-1 (Step S202), the network device 100-1 judges the type of the response frame (Step S203). Specifically, the network device 100-1 judges whether the received response frame is an ACC frame or an RJT frame. In this example, the RJT frame is a frame indicating that the request is rejected.

In a case where it is judged that the response frame is the RJT frame, the network device 100-1 proceeds to Step S205.

In a case where it is judged that the response frame is the ACC frame, the network device 100-1 registers the identifier of the server port in the coupling management table 910 (Step S204) and proceeds to Step S205. Specifically, the following processing is executed.

The network device 100-1 identifies the server_IF 140 to which the server 200-1 that has transmitted the FLOGI frame is coupled. Then, the network device 100 generates an entry in the coupling management table 910 and stores an identifier of the identified server_IF 140 in the server_IF_ID 911 of the generated entry.

The network device 100-1 acquires the D_ID 1120 of the ACC frame and stores the acquired D_ID 1120 in the server port 912 of the generated entry. Further, the network device 100-1 stores "no" in the state 915 of the generated entry.

This completes the processing of Step S204.

Then, the network device 100-1 transmits the received response frame to the server 200 (Step S205) and ends the processing.

It should be noted that in a case where the response frame is not received in a predetermined period of time, the network device 100-1 notifies the server 200-1 of an error and ends the processing.

Figure 12:
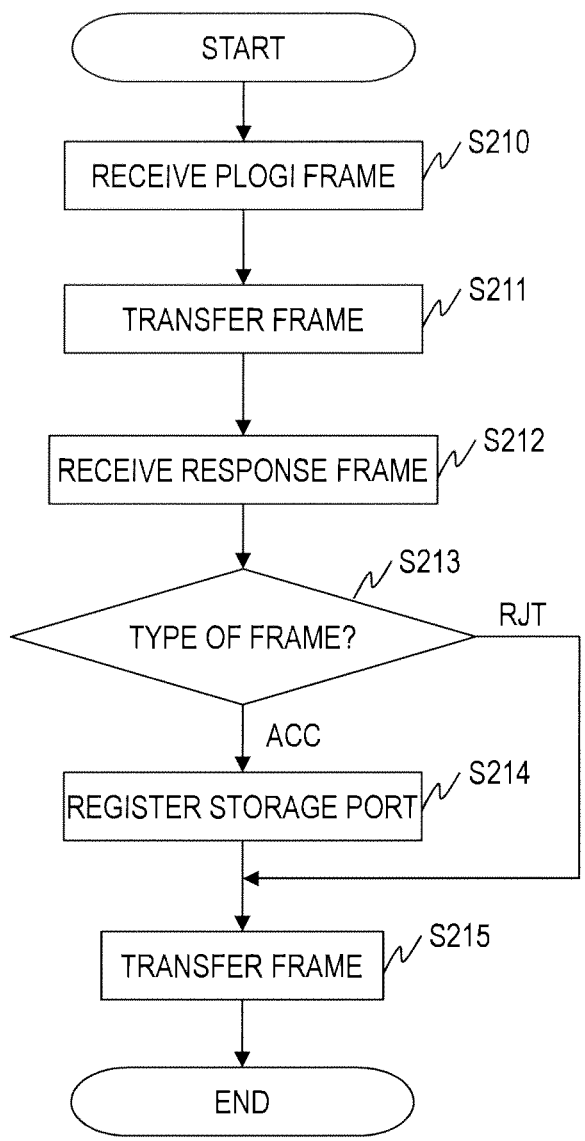
FIG. 12 is a flow chart illustrating processing executed by the network device according to the embodiment of this invention.

FIG. 12 is a flow chart illustrating processing executed by the network device 100-1 according to the embodiment of this invention. FIG. 12 illustrates the processing of the network device 100-1 that has received the PLOGI frame.

In a case of receiving the PLOGI frame from the server 200-1 (Step S210), the network device 100-1 transfers the frame to the switch included in the SAN 800-1 (Step S211). It should be noted that the method of judging the received frame is the same as that used in Step S200, and therefore a description thereof is omitted.

After transferring the PLOGI frame, the network device 100-1 waits for a response frame transmitted from the switch included in the SAN 800-1.

In a case of receiving the response frame from the switch included in the SAN 800-1 (Step S212), the network device 100-1 judges the type of the response frame (Step S213). Specifically, the network device 100-1 judges whether the received frame is an ACC frame or an RJT frame.

In a case where it is judged that the response frame is the RJT frame, the network device 100-1 proceeds to Step S215.

In a case where it is judged that the response frame is the ACC frame, the network device 100-1 registers the storage port in the coupling management table 910 (Step S214) and proceeds to Step S215. Specifically, the following processing is executed.

The network device 100-1 analyzes the ACC frame to acquire the DID 1120 and the S_ID 1130.

Further, the network device 100-1 searches the coupling management table 910 for a corresponding entry based on the identifier of the server_IF 140 and the D_ID 1120. It should be noted that the identifier of the server_IF 140 is the identifier of the server_IF 140 that has received the PLOGI frame.

The network device 100 stores the acquired S_ID 1130 in the storage port 913 of the found entry.

This completes the processing of Step S214.

Then, the network device 100-1 transmits the received response frame to the server 200-1 (Step S215) and ends the processing.

It should be noted that when the response frame is not received in a predetermined period of time, the network device 100-1 notifies the server 200-1 of an error and ends the processing.

Figure 13:
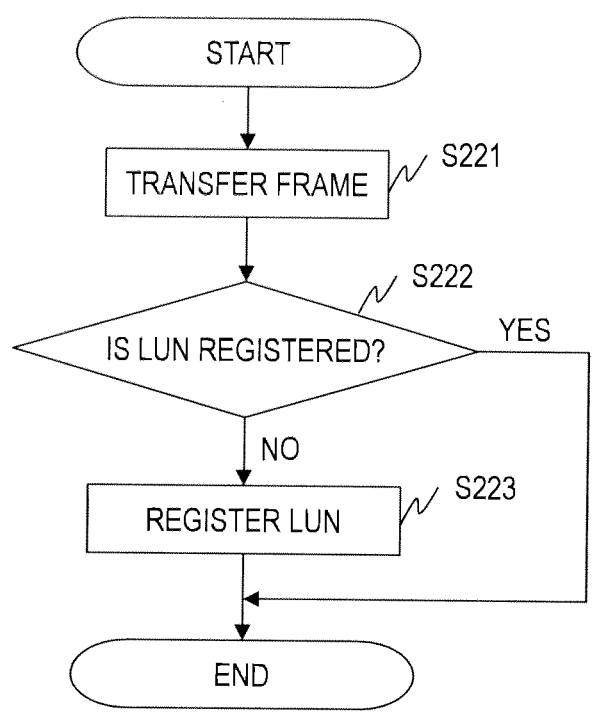
FIG. 13 is a flow chart illustrating processing executed by the network device according to the embodiment of this invention.

FIG. 13 is a flow chart illustrating processing executed by the network device 100-1 according to the embodiment of this invention. FIG. 13 illustrates the processing of the network device 100-1 that has received the FCP_CMND frame.

In a case of receiving the FCP_CMND frame from the server 200-1, the network device 100-1 analyzes the frame. Specifically, the following processing is executed.

The network device 100-1 identifies the server_IF 140 that has received the FCP_CMND frame and acquires an identifier of the identified server_IF 140. The network device 100-1 also acquires the D_ID 1120, the S_ID 1130, and the LUN 1220 from the FCP_CMND frame.

The network device 100-1 searches the coupling management table 910 for an entry that matches the acquired identifier of the server_IF 140 and the acquired D_ID 1120 and S_ID 1130. The network device 100-1 judges whether or not the state 915 of the found entry is "no".

This is because when the state 915 is not "no", the network device 100-1 needs to refer to the conversion table 950 to transfer the FCP_CMND frame to the other location. In this example, the live migration process is not executed, and hence it is judged that the state 915 of the found entry is "no".

In a case where it is judged that the state 915 of the entry is "no", the network device 100-1 executes normal transfer processing.

The network device 100-1 transfers the FCP_CMND frame to the switch included in the SAN 800-1 (Step S221).

The network device 100-1 refers to the coupling management table 910 to judge whether or not the LUN is registered in the corresponding entry (Step S222). Specifically, the network device 100-1 judges whether or not the LUN is registered in the LUN 914 of the entry found in Step S220. When it is judged that the LUN is registered, the network device 100 ends the processing.

In a case where it is judged that the LUN is not registered, the network device 100-1 registers the LUN 1220 (Step S223) and ends the processing. Specifically, the network device 100-1 stores the acquired LUN 1220 in the LUN 914 of the corresponding entry.

Figure 14:
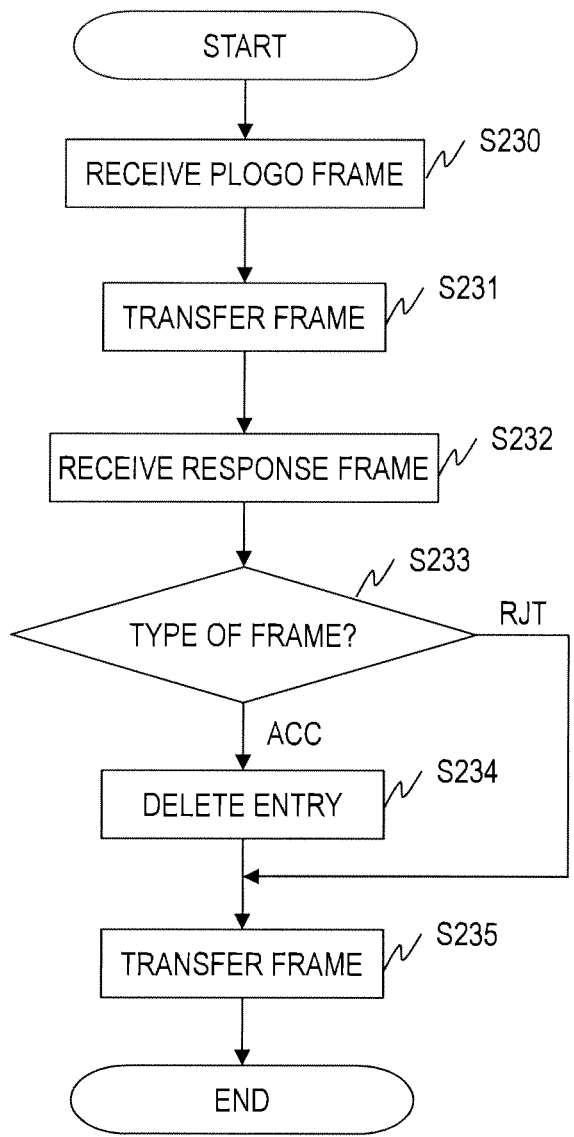
FIG. 14 is a flow chart illustrating processing executed by the network device according to the embodiment of this invention.

FIG. 14 is a flow chart illustrating processing executed by the network device 100-1 according to the embodiment of this invention. FIG. 14 illustrates the processing of the network device 100-1 that has received the PLOGO frame.

In a case of receiving the PLOGO frame from the server 200-1 (Step S230), the network device 100-1 transfers the frame to the switch included in the SAN 800-1 (Step S231). Thereafter, the network device 100-1 waits for a response frame transmitted from the switch included in the SAN 800-1.

In a case of receiving the response frame from the switch included in the SAN 800-1 (Step S232), the network device 100-1 judges the type of the response frame (Step S233). Specifically, the network device 100-1 judges whether the received frame is an ACC frame or an RJT frame.

In a case where it is judged that the response frame is the RJT frame, the network device 100-1 proceeds to Step S235.

In a case where it is judged that the response frame is the ACC frame, the network device 100-1 deletes a corresponding entry from the coupling management table 910 (Step S234) and proceeds to Step S235. It should be noted that the method of searching for the corresponding entry is the same as that used in Step S214, and therefore a description thereof is omitted.

The network device 100-1 transfers the received response frame to the server 200-1 (Step S235) and ends the processing.

It should be noted that when the response frame is not received in a predetermined period of time, the network device 100-1 notifies the server 200-1 of an error and ends the processing.

It should be noted that when receiving a frame other than the above-mentioned frames, the network device 100-1 executes processing of transferring the frame. The processing of transferring the frame may be performed by using a known technology, and therefore a description thereof is omitted.

In a case where the processing illustrated in FIG. 10 ends, the coupling management table 910 as illustrated in FIGS. 5A and 5B is generated.

(In Executing Live Migration Process)

The live migration process in which the VM 3 (400-3) operating on the server 200-1 is migrated to the server 200-3 is described.

Figure 15A:
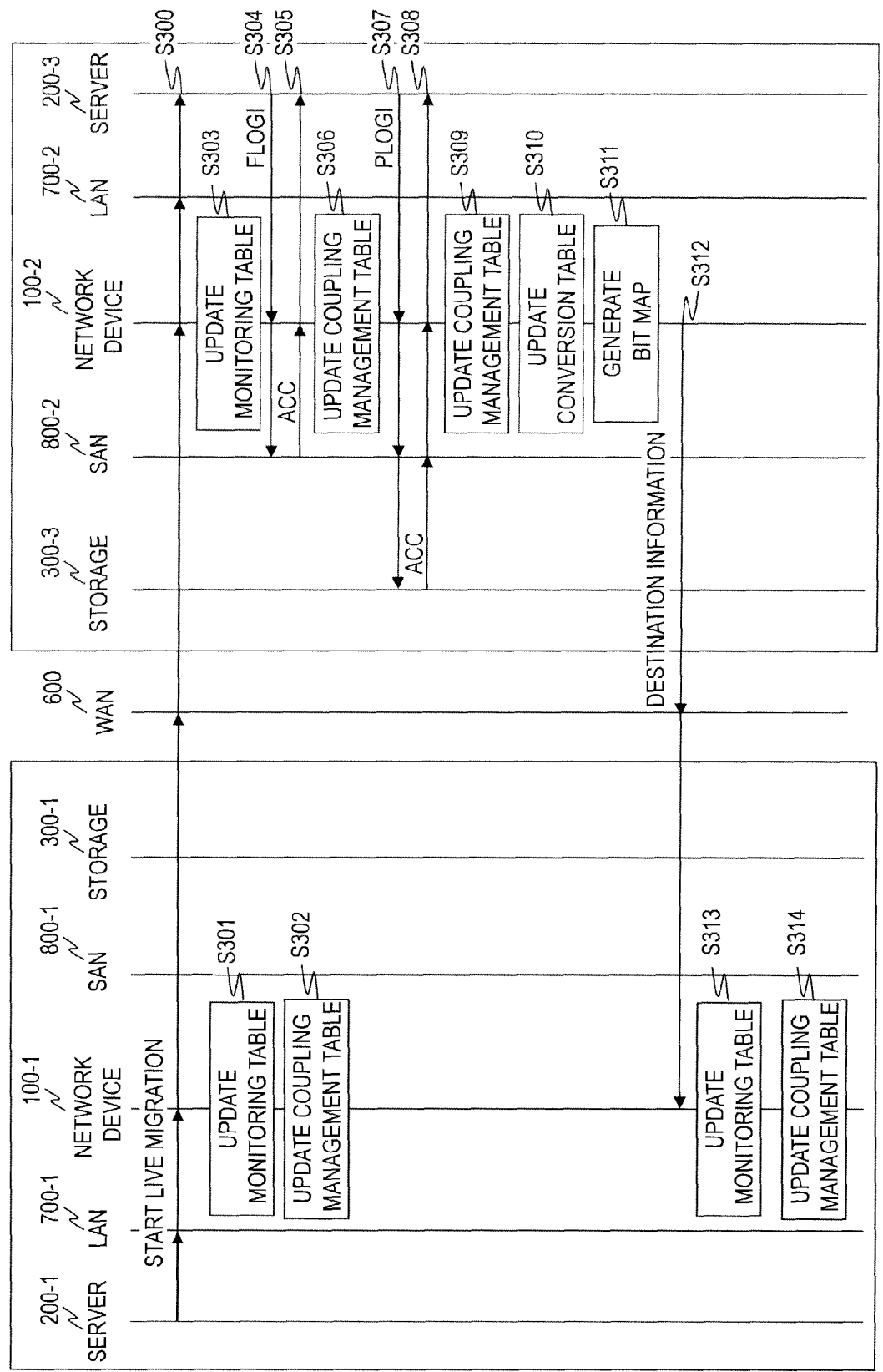
FIGS. 15A and 15B are sequence charts illustrating a flow of the live migration process according to the embodiment of this invention.
Figure 15B:
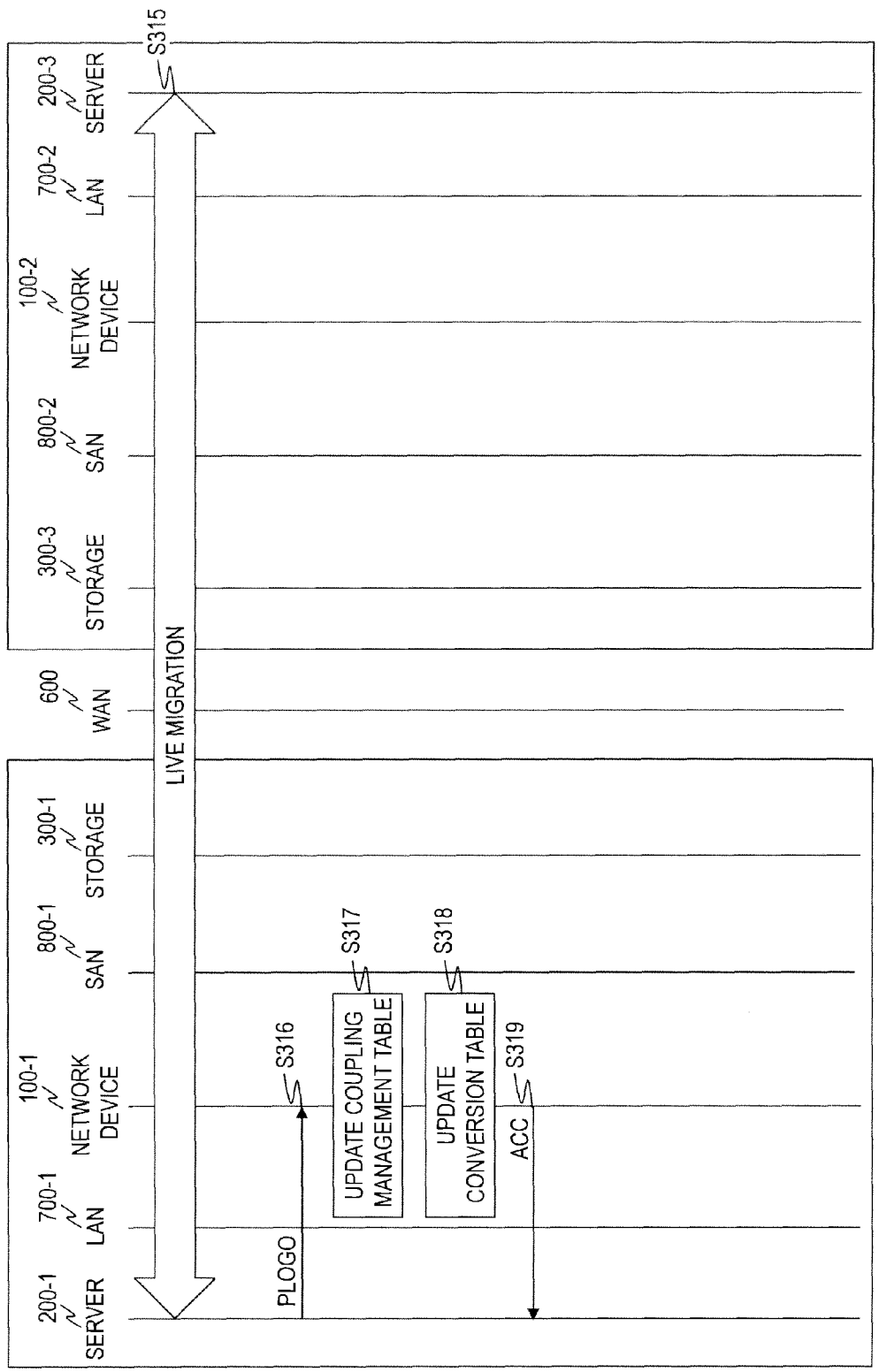

FIGS. 15A and 15B are sequence charts illustrating a flow of the live migration process according to the embodiment of this invention.

The server 200-1 transmits an IP packet including a message to start live migration of the VM 3 (400-3) to the server 200-3 (Step S300). The IP packet stores the IP address of the server 200-1 as the migration source and the IP address of the server 200-3 as the migration destination.

It should be noted that in a case of receiving an instruction to execute the live migration process from the administrator or in a case of satisfying a predetermined condition for the execution, the server 200-1 transmits the above-mentioned IP packet. For example, it is conceivable that the predetermined condition may include reaching a preset time.

The network device 100-1 transfers the IP packet to the network device 100-2 via the WAN 600. At this time, the network device 100-1 updates the monitoring table 940 and the coupling management table 910 (Steps S301 and S302). The update processing is described in detail later with reference to FIG. 16.

It should be noted that the network device 100-1 has received the IP packet from the LAN_IF 130, which leads to the recognition that the location to which the network device 100-1 belongs is the migration source.

By referring to the monitoring table 940, the network device 100-1 may discriminate the frames and IP packets transmitted/received between the servers 200 subjected to the live migration.

In a case of receiving the IP packet, the network device 100-2 transfers the IP packet to the server 200-3 of the migration destination. At this time, the network device 100-2 updates the monitoring table 940 (Step S303). The update processing is described in detail later with reference to FIG. 21.

By referring to the monitoring table 940, the network device 100-2 may discriminate the frames and IP packets transmitted/received between the servers 200 subjected to the live migration.

It should be noted that the network device 100-2 has received the IP packet from the WAN_IF 160, which leads to the recognition that the location to which the network device 100-2 belongs is the migration destination.

In a case of receiving the IP packet, the server 200-3 executes the login process for securing a storage area to be allocated to the VM 3 (400-3) (Steps S304 to S308). It should be noted that processing of Steps S304 to S308 is the same processing as Steps S100 to S104, and therefore a description thereof is omitted.

After completing the login process, the network device 100-2 updates the coupling management table 910 and the conversion table 950 (Steps S309 and S310). The update processing is described in detail later with reference to FIG. 21.

The network device 100-2 generates a bit map corresponding to blocks of the newly allocated recording area (Step S311). Then, the network device 100-2 transmits an IP packet including destination information to the network device 100-1 via the WAN 600 (Step S312).

In a case of receiving the IP packet including the destination information, the network device 100-1 updates the monitoring table 940 and the coupling management table 910 (Steps S313 and S314). The update processing is described in detail later with reference to FIG. 16.

It should be noted that the destination information includes the server port and the storage port, which are acquired in the processing of Steps S304 to S308.

In the live migration process, the hypervisor 250 transfers information on the VM 3 (400-3) managed on the memory 220 to the server 200-3 of the migration destination (Step S315). It should be noted that the live migration process is a known technology, and therefore a description thereof is omitted.

It should be noted that the register information of the VM 400 and the information on the VM 400 stored on the memory 220 are data to be migrated. Therefore, the data is smaller in capacity than information stored in the storage 300-1 and may be migrated in a short period of time.

At this time, the information stored in the storage 300-1 is not migrated to the storage 300-3.

After completing the live migration process, the server 200-1 transmits a PLOGO frame to the storage 300-1 (Step S316). This processing is performed in order to release the storage area allocated to the VM 3 (400-3).

In a case of receiving the PLOGO frame transmitting to the storage 300-1, the network device 100-1 updates the coupling management table 910 and the conversion table 950 (Steps S317 and S318). The update processing is described in detail later with reference to FIG. 16.

The storage 300-1 stores data that has been used by the VM 3 (400-3). In this embodiment, the data stored in the storage 300-1 is left as it is in the location 500-1 of the migration source. In other words, the data stored in the storage 300-1 of the migration source is not migrated to the storage 300-3 of the migration destination.

The network device 100-1 does not transfer the PLOGO frame to the switch included in the SAN 800-1, but transmits an ACC frame to the server 200-1 in place of the storage 300-1 (Step S319).

This way, the server 200-1 recognizes that the processing has successfully been completed. On the other hand, the data that has been used by the VM 3 (400-3) is left as it is in the storage 300-1.

Next, processing of the network device 100 is described.

Figure 16:
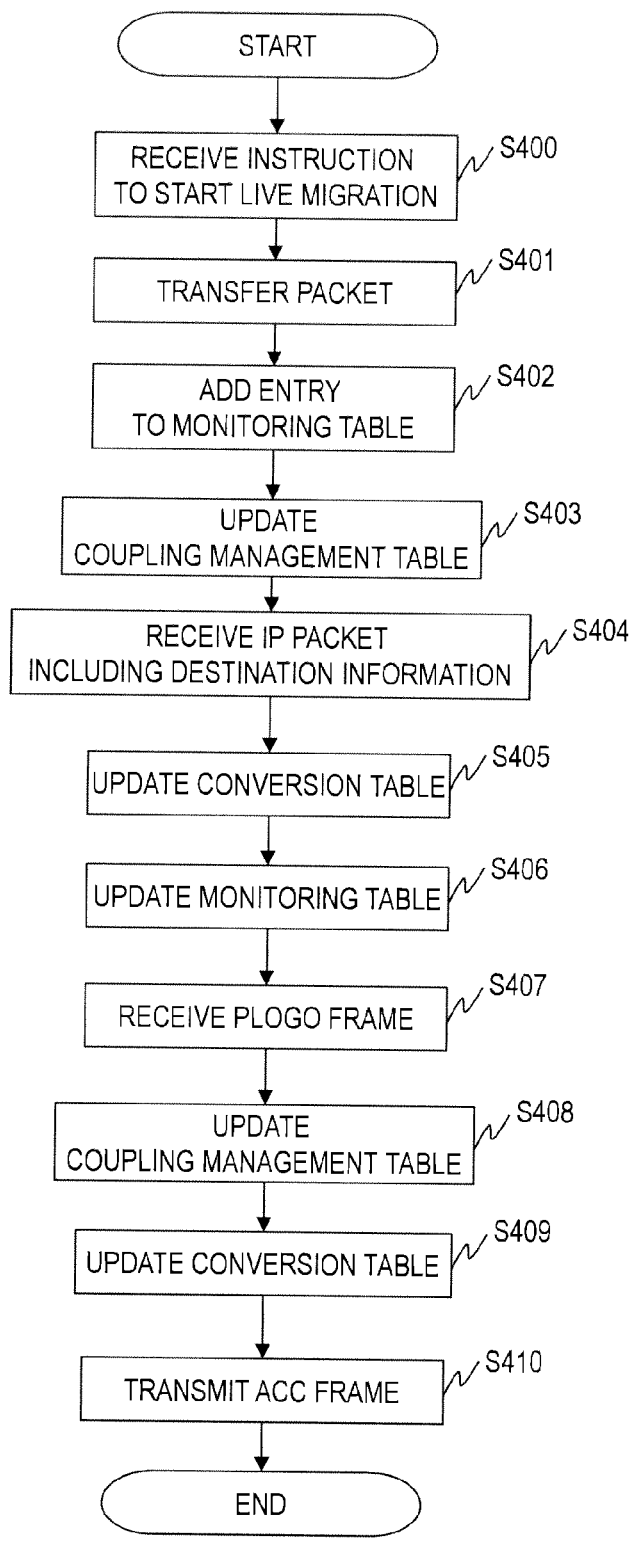
FIG. 16 is a flow chart illustrating processing executed by the network device according to the embodiment of this invention.

FIG. 16 is a flow chart illustrating processing executed by the network device 100-1 according to the embodiment of this invention.

In a case of receiving an IP packet including a message to start the live migration process (Step S400), the network device 100-1 analyzes the IP packet. Specifically, the following processing is executed.

The network device 100-1 judges whether or not the received IP packet is an FCIP packet. This is because when the IP packet is the FCIP packet, processing of transferring a frame is necessary. In this example, it is judged that the IP packet is not the FCIP packet.

The network device 100-1 acquires from the IP packet the IP address of the server 200-1 as the sender and the IP address of the server 200-3 as the recipient.

In this example, the network device 100-1 has received the IP packet via the LAN_IF 130, which leads to the recognition that the location 500-1 to which the network device 100-1 belongs is the migration source.

This completes the processing of Step S400.

Then, the network device 100-1 transfers the received IP packet to the network device 100-2 via the WAN 600 (Step S401).

The network device 100-1 adds a new entry to the monitoring table 940 (Step S402). Specifically, the following processing is executed.

The network device 100-1 generates an entry in the monitoring table 940 and stores the acquired IP address of the server 200-1 and the acquired IP address of the server 200-3 in the source_IP 941 and the destination_IP 942 of the generated entry, respectively.

The network device 100-1 also stores "source" in the attribute 943 of the generated entry.

After completion of the processing of Step S402, the monitoring table 940 becomes the state as illustrated in FIG. 8A.

This completes the update processing of Step S402.

Then, the network device 100-1 updates the coupling management table 910 (Step S403). Specifically, the following processing is executed.

The network device 100-1 refers to the monitoring table 940 and searches the server management table 930 for an entry having the server_IP 932 that matches the source_IP 941. The network device 100-1 acquires the server_IF_ID 931 from the found entry.

The network device 100-1 searches the coupling management table 910 for an entry having the server_IF_ID 911 that matches the acquired server_IF_ID 931.

The network device 100-1 judges whether or not the state 915 of the found entry is "no".

In a case where it is judged that the state 915 of the found entry is "no", the network device 100-1 changes the state 915 to "in progress". In a case where it is judged that the state 915 of the found entry is not "no", the network device 100-1 does not change the state 915.

FIG. 17 illustrates a state of the coupling management table 910 after the completion of the processing of Step S403.

This completes the update processing of Step S403.

After transferring the IP packet, the network device 100-1 waits for a response from the network device 100-2.

In a case of receiving the IP packet including the destination information (Step S404), the network device 100-1 updates the conversion table 950 (Step S405). Specifically, the following processing is executed.

The network device 100-1 judges whether or not the IP packet is an FCIP packet. In this example, it is judged that the IP packet is not the FCIP packet. The network device 100-1 acquires the identifiers of the server port and the storage port from the destination information, and acquires the IP address of the server 200-3 as the sender from the IP packet.

The network device 100-1 generates an entry in the conversion table 950 and stores the acquired identifiers of the server port and the storage port in the server port 956 and storage port 957 of the generated entry, respectively. The network device 100-1 also stores the acquired IP address of the server 200-3 in the transfer_destination_IP 959 of the generated entry. FIG. 18 illustrates a state of the conversion table 950 after the completion of the processing of Step S405. From this table, the network device 100-1 may identify the transfer destination of the data.

This completes the update processing of Step S405.

Then, the network device 100-1 deletes the corresponding entry from the monitoring table 940 (Step S406).

Specifically, the network device 100-1 searches the monitoring table 940 for an entry having the destination_IP 942 that matches the acquired IP address of the server 200-3. The network device 100-1 deletes the found entry from the monitoring table 940.

In a case of receiving the PLOGO frame (Step S407), the network device 100-1 updates the coupling management table 910 (Step S408). Specifically, the following processing is executed.

The network device 100-1 identifies the identifier of the server_IF 140 that has received the PLOGO frame. Further, the network device 100-1 analyzes the received PLOGO frame to acquire the D_ID 1120 corresponding to the storage port and the S_ID 1130 corresponding to the server port.

The network device 100-1 searches the coupling management table 910 for an entry that matches the identifier of the server_IF 140, the D_ID 1120, and the S_ID 1130.

The network device 100-1 changes the state 915 of the found entry from "in progress" to "source".

Further, the network device 100-1 searches the coupling management table 910 for an entry that matches the identifier of the server_IF 140. It should be noted that the entry having the state 915 that has changed to "source" is excluded from the search processing.

The network device 100-1 changes the state 915 of the found entry from "in progress" to "no".

FIG. 19 illustrates a state of the coupling management table 910 after completion of the processing of Step S408.

This completes the update processing of Step S408.

Then, the network device 100-1 updates the conversion table 950 (Step S409). Specifically, the following processing is executed.

The network device 100-1 analyzes the PLOGO frame to acquire the D_ID 1120, the S_ID 1130, and the LUN 1220.

Then, the network device 100-1 stores the acquired S_ID 1130, D_ID 1120, and LUN 1220 in the server port 953, the storage port 954, and the LUN 955 of the entry generated in Step S405, respectively.

FIG. 20 illustrates a state of the conversion table 950 after the completion of the processing of Step S409.

This completes the update processing of Step S409.

Then, the network device 100-1 transmits an ACC frame to the server 200-1 (Step S410) and ends the processing.

Figure 21:
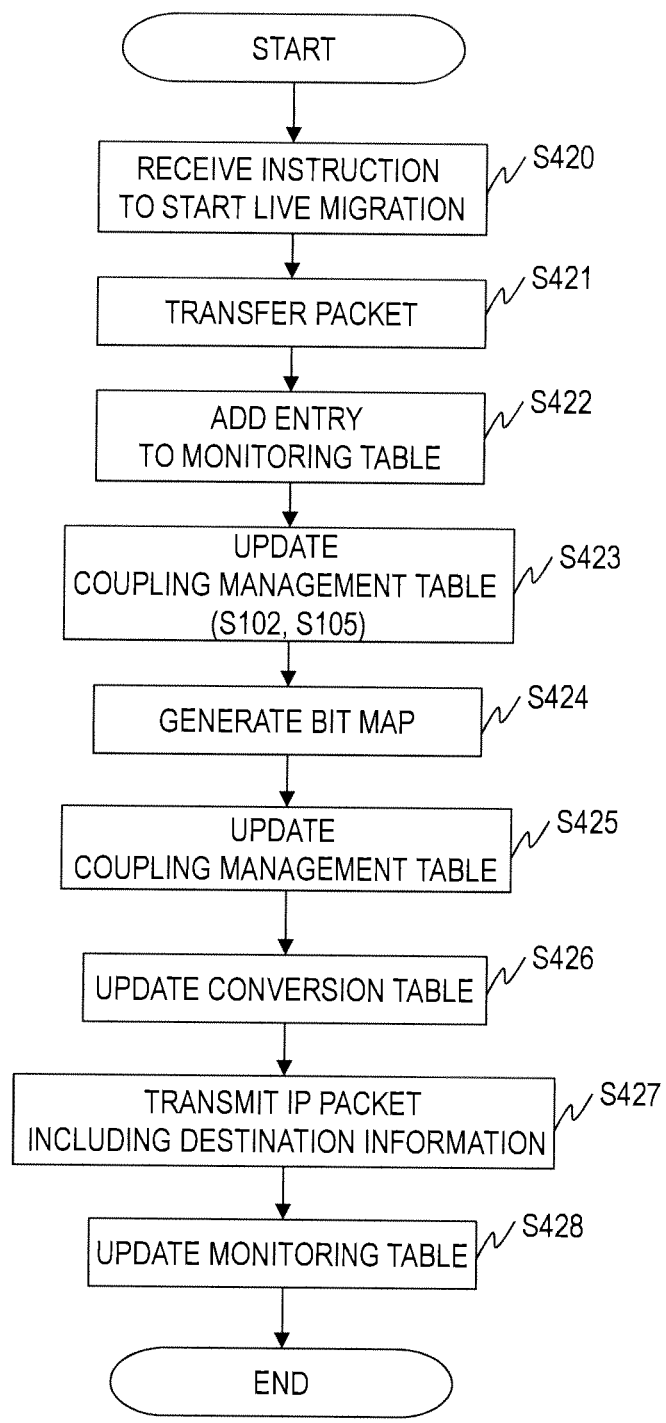
FIG. 21 is a flow chart illustrating processing executed by the network device according to the embodiment of this invention.

FIG. 21 is a flow chart illustrating processing executed by the network device 100-2 according to the embodiment of this invention.

In a case of receiving the IP packet including the message to start the live migration (Step S420), the network device 100-2 analyzes the IP packet. Specifically, the following processing is executed.

The network device 100-2 judges whether or not the IP packet is an FCIP packet. In this example, it is judged that the IP packet is not the FCIP packet. The network device 100-2 acquires from the IP packet the IP address of the server 200-1 as the sender and the IP address of the server 200-3 as the recipient.

In this example, the network device 100-2 has received the IP packet via the WAN_IF 160, and hence it is understood that the location 500-2 to which the network device 100-2 belongs is the migration destination.

This completes the processing of Step S420.

Then, the network device 100-2 transfers the received IP packet to the server 200-3 via a LAN 700-2 (Step S421). The network device 100-2 also adds a new entry to the monitoring table 940 (Step S422). Specifically, the following processing is executed.

The network device 100-2 generates an entry in the monitoring table 940 and stores the IP address of the server 200-1 and the IP address of the server 200-3 in the source_IP 941 and the destination_IP 942 of the generated entry, respectively.

The network device 100-2 also stores "destination" in the attribute 943 of the generated entry.

After completion of the processing of Step S422, the monitoring table 940 becomes the state as illustrated in FIG. 8B.

This completes the update processing of Step S422.

Then, the network device 100-2 updates the coupling management table 910 (Step S423). Specifically, the network device 100-2 executes the processing illustrated in FIGS. 11 and 12.

FIG. 22 illustrates a state of the coupling management table 910 after the completion of the processing of Step S423.

The network device 100-2 generates a bit map (Step S424). At this time, a unique identifier is given to the bit map.

The network device 100-2 updates the coupling management table 910 and the conversion table 950 (Steps S425 and S426). Specifically, the following processing is executed.

The network device 100-2 stores the identifier of the bit map in the bitmap_ID 916 of the entry generated in Step S423 and changes the state 915 of the entry from "no" to "destination".

The network device 100-2 also refers to the coupling management table 910 to acquire the server port 912 and the storage port 913 of the entry generated in Step S423.

The network device 100-2 searches the location coupling management table 920 for an entry having the network_device_IP 922 that matches the source_IP 941 of the monitoring table 940. The network device 100-2 acquires the network_device_IP 922 of the found entry.

The network device 100-2 generates a new entry in the conversion table 950 and stores the acquired server port 912 and storage port 913 in the server port 953 and the storage port 954 of the generated entry, respectively.

The network device 100-2 also stores the acquired network_device_IP 922 in the transfer_destination_IP 959 of the generated entry.

FIG. 23 illustrates a state of the coupling management table 910 after the completion of the processing of Step S425. FIG. 24 illustrates a state of the conversion table 950 after the completion of the processing of Step S426.

This completes the update processing of Steps S425 and S426.

Then, the network device 100-2 transmits an IP packet including the destination information to the network device 100-1 (Step S427) and deletes the corresponding entry from the monitoring table 940 to end the processing (Step S428).

Specifically, the network device 100-2 searches the monitoring table 940 for entries that match IP addresses of the recipient and the sender of the IP packet. The network device 100-2 deletes the found entries from the monitoring table 940.

It should be noted that in Step S426, the network device 100-2 may acquire the information on the VM 3 (400-3) by making an inquiry to the network device 100-1. Specifically, the network device 100-2 acquires the server port, the storage port, and the LUN in the location 500-1.

(After Completion of Live Migration Process)

The processing of the network system after completing the live migration process is described.

Figure 25A:
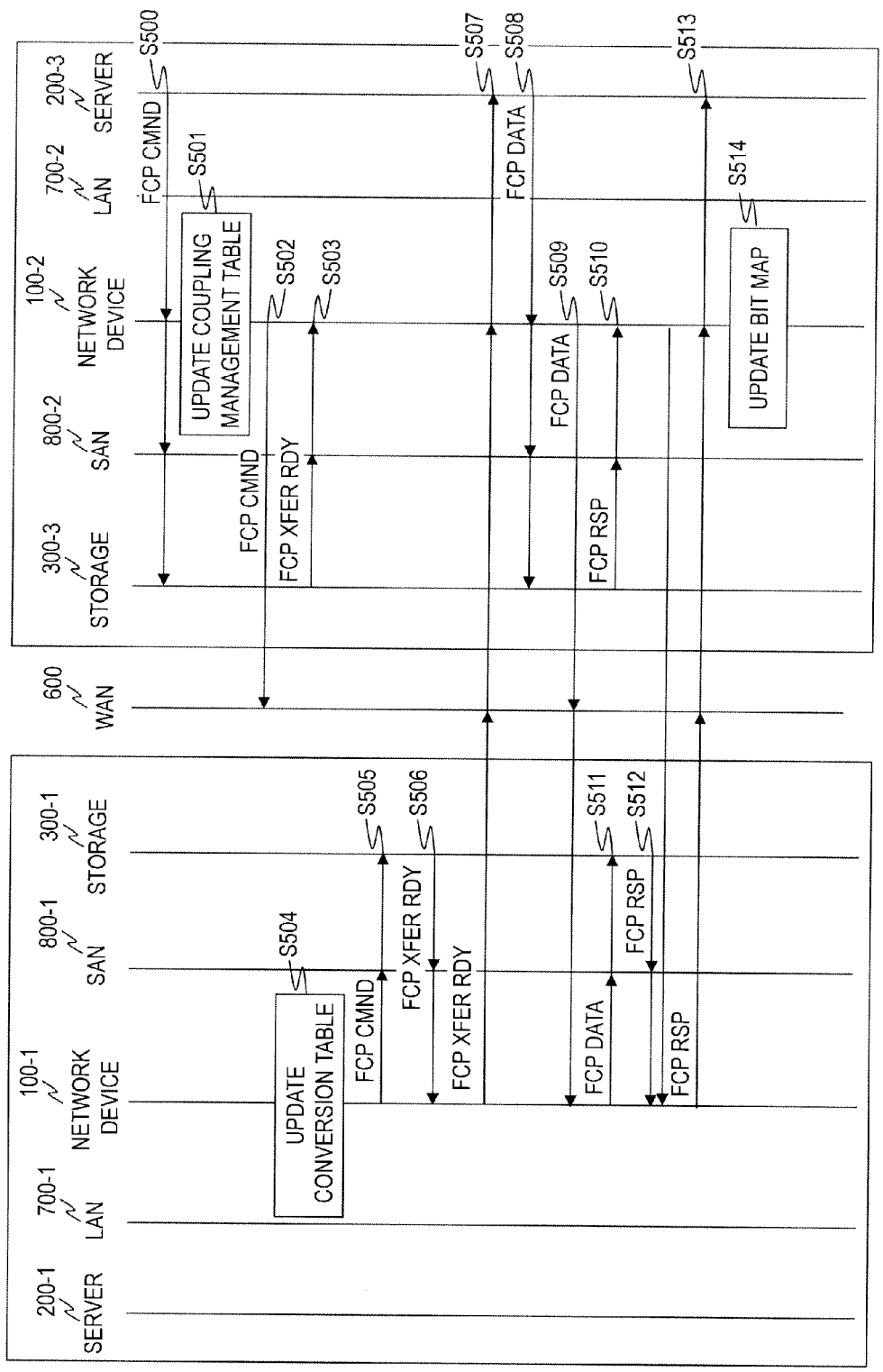
FIGS. 25A and 25B are sequence charts illustrating a flow of the processing after the live migration process according to the embodiment of this invention.
Figure 25B:
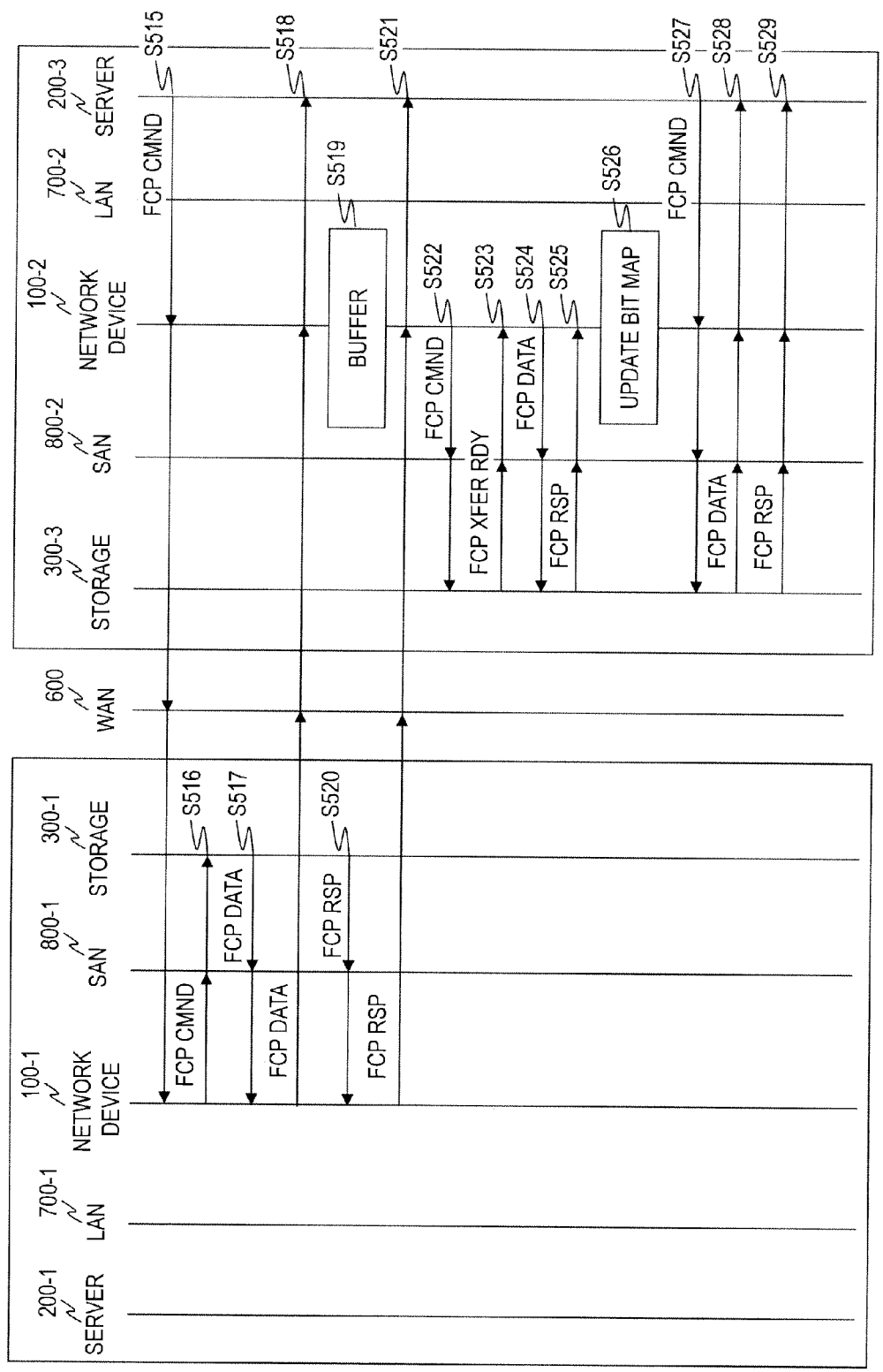

FIGS. 25A and 25B are sequence charts illustrating a flow of the processing after the live migration process according to the embodiment of this invention.

First, the data write processing is described with reference to FIG. 25A.

The server 200-3 transmits an FCP_CMND frame which instructs to write a data to the storage 300-3 (Step S500).

In a case of receiving the FCP_CMND frame, the network device 100-2 updates the coupling management table 910 (Step S501).

The network device 100-2 transfers the received FCP_CMND frame to a switch included in a SAN 800-2. Further, the network device 100-2 encapsulates the same FCP_CMND frame to convert the FCP_CMND frame into an FCIP packet, and refers to the conversion table 950 to transfer the FCIP packet to the network device 100-1 (Step S502).

This processing is performed in order to reflect the same data in the storage 300-1 that was used before the migration.

In a case of receiving the FCP_CMND frame, the switch included in the SAN 800-2 transfers the frame to the storage 300-3.

In a case of receiving the FCP_CMND frame, the storage 300-3 transmits an FCP_XFER_RDY frame to the server 200-3 in response (Step S503).

In a case of receiving the FCP_XFER_RDY frame transmitting to the server 200-3, the switch included in the SAN 800-2 transfers the frame to the network device 100-2. In a case of receiving the FCP_XFER_RDY frame transmitting to the server 200-3, the network device 100-2 does not transfer the frame to the server 200-3, but waits for the FCP_XFER_RDY frame transmitted from the location of the migration source.

This is because in order to reflect the data in the storage 300-1 of the migration source, there is a need to wait for write permission of the storage 300-1.

On the other hand, in a case of receiving the FCIP packet, the network device 100-1 decapsulates the FCIP packet to convert the FCIP packet into the FCP_CMND frame, and analyzes the frame to update the conversion table 950 (Step S504).

The network device 100-1 transfers the FCP_CMND frame, which is obtained as a result of the conversion, to the storage 300-1 (Step S505).

In a case of receiving the FCP_CMND frame, the switch included in the SAN 800-1 transfers the frame to the storage 300-1.

In a case of receiving the FCP_CMND frame, the storage 300-1 transmits an FCP_XFER_RDY frame to the network device 100-1 (Step S506).

In a case of receiving the FCP_XFER_RDY frame, the switch included in the SAN 800-1 transfers the frame to the network device 100-1.

In a case of receiving the FCP_XFER_RDY frame, the network device 100-1 encapsulates the frame to convert the frame into an FCIP packet, and refers to the conversion table 950 to transfer the FCIP packet to the network device 100-2 (Step S507).

In a case of receiving the FCIP packet, the network device 100-2 decapsulates the packet to convert the packet into the FCP_XFER_RDY frame. In this example, triggered by the reception of the second FCP_XFER_RDY frame, the network device 100-2 transfers the FCP_XFER_RDY frame to the server 200-3.

In a case of receiving the FCP_XFER_RDY frame, the server 200-3 transmits an FCP_DATA frame including the write data to the storage 300-3 (Step S508).

In a case of receiving the FCP_DATA frame, the network device 100-2 transfers the frame to the storage 300-3. Further, the network device 100-2 encapsulates the same FCP_DATA frame to convert the FCP_DATA frame into an FCIP packet, and refers to the conversion table 950 to transfer the FCIP packet to the network device 100-1 (Step S509).

In a case of receiving the FCP_DATA frame, the switch included in the SAN 800-2 transfers the frame to the storage 300-3.

In a case of receiving the FCP_DATA frame, the storage 300-3 transmits an FCP_RSP frame to server 200-3 in response (Step S510).

In a case of receiving the FCP_RSP frame transmitting to the server 200-3, the switch included in the SAN 800-2 transfers the frame to the network device 100-2. In a case of receiving the FCP_RSP frame transmitting to the server 200-3, the network device 100-2 does not transfer the frame to the server 200-3, but waits for the FCP_RSP frame transmitted from the location 500 of the migration source.

This processing is performed in order to confirm that the data is reflected in the storage 300-1 of the migration source.

On the other hand, in a case of receiving the FCIP packet, the network device 100-1 decapsulates the FCIP packet to convert the FCIP packet into the FCP_DATA frame, and transfers the frame to the storage 300-1 (Step S511).

In a case of receiving the FCP_DATA frame, the switch included in the SAN 800-1 transfers the frame to the storage 300-1.

In a case of receiving the FCP_DATA frame, the storage 300-1 transmits an FCP_RSP frame to the network device 100-1 in response (Step S512).

In a case of receiving the FCP_RSP frame, the switch included in the SAN 800-1 transfers the frame to the network device 100-1.

In a case of receiving the FCP_RSP frame, the network device 100-1 encapsulates the frame to convert the frame into an FCIP packet, and refers to the conversion table 950 to transfer the FCIP packet to the network device 100-2 (Step S513).

In a case of receiving the FCIP packet, the network device 100-2 decapsulates the packet to convert the packet into the FCP_RSP frame. In this example, triggered by the reception of the second FCP_RSP frame, the network device 100-2 transfers the FCP_RSP frame to the server 200-3.

At this time, the network device 100-2 updates the bit map to end the data writing (Step S514). Specifically, bits corresponding to blocks in which data is written are updated.

Next, the data read processing is described with reference to FIG. 25B.

First, the server 200-3 transmits an FCP_CMND frame which instructs to read a data to the storage 300-3 (Step S515).

In a case of receiving the FCP_CMND frame, the network device 100-2 refers to the bit map to judge whether or not the data to be read is stored in the storage 300-3. This is because immediately after the execution of the live migration process, the data is not stored in the storage 300-3 but is stored in the storage 300-1.

In this example, a case where the requested data is not stored in the storage 300-3 is assumed. Therefore, the network device 100-2 executes processing for acquiring the data from the location of the migration source.

The network device 100-2 encapsulates the received FCP_CMND frame to convert the FCP_CMND frame into an FCIP packet, and refers to the conversion table 950 to transfer the FCIP packet, which is obtained as a result of the conversion, to the network device 100-1.

In a case of receiving the FCIP packet, the network device 100-1 decapsulates the packet into the FCP_CMND frame, and transfers the FCP_CMND frame, which is obtained as a result of the conversion, to the storage 300-1 (Step S516).

In a case of receiving the FCP_CMND frame, the switch included in the SAN 800-1 transfers the frame to the storage 300-1.

In a case of receiving the FCP_CMND frame, the storage 300-1 reads predetermined data and transmits an FCP_DATA frame including the read data to the network device 100-1 (Step S517).

In a case of receiving the FCP_DATA frame, the switch included in the SAN 800-1 transfers the frame to the network device 100-1.

In a case of receiving the FCP_DATA frame, the network device 100-1 encapsulates the frame to convert the frame into an FCIP packet, and refers to the conversion table 950 to transfer the FCIP packet, which is obtained as a result of the conversion, to the network device 100-2 (Step S518).

In a case of receiving the FCIP packet, the network device 100-2 decapsulates the packet to convert the packet into the FCP_DATA frame, and refers to the conversion table 950 to transfer the FCP_DATA frame to the server 200-3. Through this processing, the data requested by the server 200-3 is read.

At this time, the network device 100-2 also temporarily buffers the received FCP_DATA frame (Step S519). This processing is performed in order to reflect the data read from the storage 300-1 of the migration source in the storage 300-3 of the migration destination.

On the other hand, in a case where all pieces of data are read, the storage 300-1 transmits an FCP_RSP frame to the network device 100-1 (Step S520).

In a case of receiving the FCP_RSP frame, the switch included in the SAN 800-1 transfers the frame to the network device 100-1.

In a case of receiving the FCP_RSP frame, the network device 100-1 encapsulates the frame to convert the frame into an FCIP packet, and refers to the conversion table 950 to transfer the packet, which is obtained as a result of the conversion, to the network device 100-2 (Step S521).

In a case of receiving the FCIP packet, the network device 100-2 decapsulates the packet to convert the packet into the FCP_RSP frame, and refers to the conversion table 950 to transfer the FCP_RSP frame, which is obtained as a result of the conversion, to the server 200-3.

Triggered by the reception of the FCP_RSP frame, the network device 100-2 also writes the buffered data in the storage 300-3. First, the network device 100-2 transmits an FCP_CMND frame to the storage 300-3 (Step S522).

In a case of receiving the FCP_CMND frame, the switch included in the SAN 800-2 transfers the frame to the storage 300-3.

In a case of receiving the FCP_CMND frame, the storage 300-3 transmits an FCP_XFER_RDY frame to the network device 100-2 in response (Step S523).

In a case of receiving the FCP_XFER_RDY frame, the switch included in the SAN 800-2 transfers the frame to the network device 100-2.

In a case of receiving the FCP_XFER_RDY frame, the network device 100-2 transmits the FCP_DATA frame including the buffered data to the storage 300-3 (Step S524).

In a case of receiving the FCP_DATA frame, the switch included in the SAN 800-2 transfers the frame to the storage 300-3.

In a case where the FCP_CMND frame is received and all pieces of data are written, the storage 300-3 transmits an FCP_RSP frame to the network device 100-2 in response (Step S525).

In a case of receiving the FCP_RSP frame, the switch included in the SAN 800-2 transfers the frame to the network device 100-2.

In a case of receiving the FCP_RSP frame, the network device 100-2 updates the bit map (Step S526).

Through the above-mentioned processing, the data read from the storage 300-1 of the migration source is reflected in the storage 300-3 of the migration destination, and hence the same data is read from the storage 300-3 thereafter. Specifically, the following processing is performed.

The server 200-3 transmits an FCP_CMND frame which instructs to read a data to the storage 300-3 (Step S527).

In a case of receiving the FCP_CMND frame, the network device 100-2 refers to the bit map to judge whether or not the data to be read is stored in the storage 300-3. In this example, it is assumed that the data to be read is stored in the storage 300-3.

The network device 100-2 transfers the received FCP_CMND frame to the storage 300-3.

In a case of receiving the FCP_CMND frame, the switch included in the SAN 800-2 transfers the frame to the storage 300-3.

In a case of receiving the FCP_CMND frame, the storage 300-3 reads predetermined data and transmits an FCP_DATA frame including the read data to the server 200-3 (Step S528).

In a case of receiving the FCP_DATA frame, the switch included in the SAN 800-2 transfers the frame to the network device 100-2.

In a case of receiving the FCP_DATA frame, the network device 100-2 transfers the frame to the server 200-3.

In a case where all pieces of data are read, the storage 300-3 transmits an FCP_RSP frame to the server 200-3 (Step S529).

In a case of receiving the FCP_RSP frame, the switch included in the SAN 800-2 transfers the frame to the network device 100-2.

In a case of receiving the FCP_RSP frame, the network device 100-2 transfers the FCP_RSP frame to the server 200-3 to end the processing.

Through the above-mentioned processing, the VM 400 may share the storages of the migration destination and the migration source.

In other words, in a case of receiving a read request after the live migration process, the network device 100 performs control so that data residing in the location 500 of the migration destination, that is, in the storage 300 in the own location 500 is read from the storage 300 in the own location 500, and so that data not residing in the storage 300 in the own location 500 is read from the storage 300 in the location 500 of the migration source. This allows the data stored in the storage 300 of the migration source to be shared with the migration destination.

The network device 100 also writes the data that is read once in the storage 300 in the own location 500, to thereby allow the same data to be read at high speed.

On the other hand, in a case of receiving a write request, the network device 100 performs control so that the data is written in both the storage 300 in the own location 500 and the storage 300 in the other location. This allows the update data in the storage 300 of the migration destination to be reflected in the storage 300 of the migration source, to thereby maintain consistency of the data.

Next, the processing of the network device 100 is described.

Figure 26:
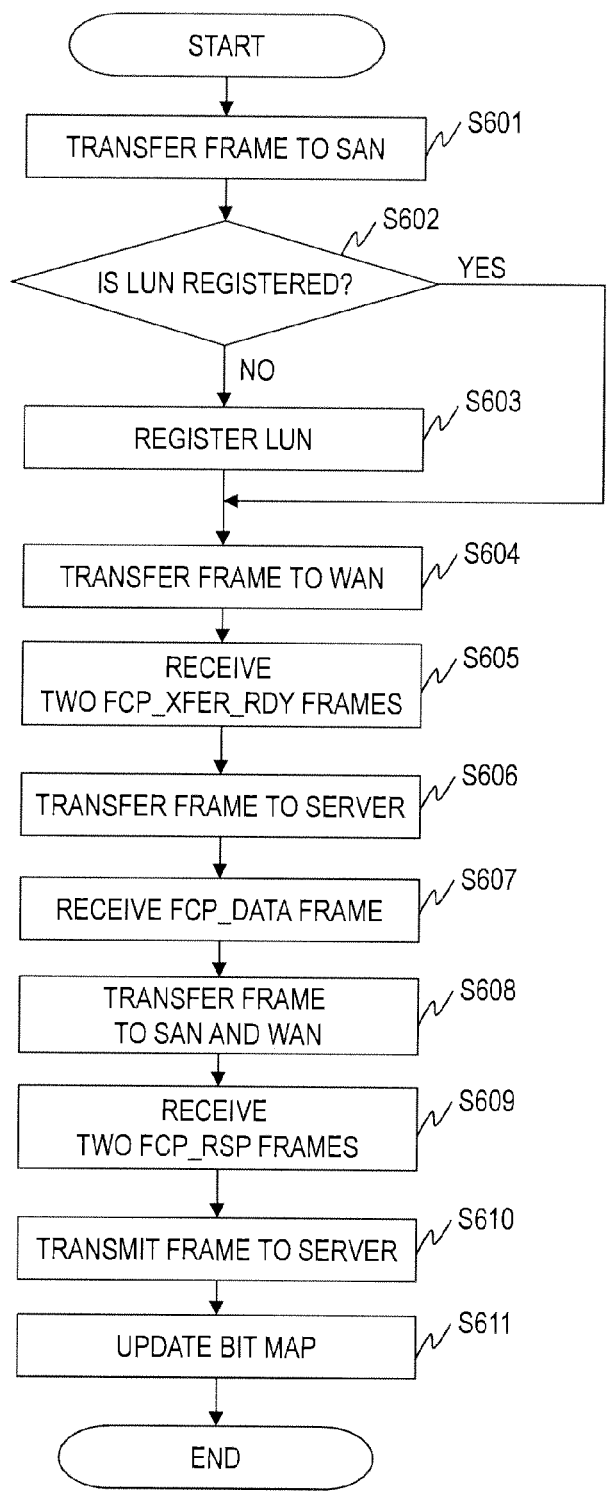
FIGS. 26 and 27 are flow charts illustrating the processing executed by the network device 100-2 according to the embodiment of this invention.
Figure 27:
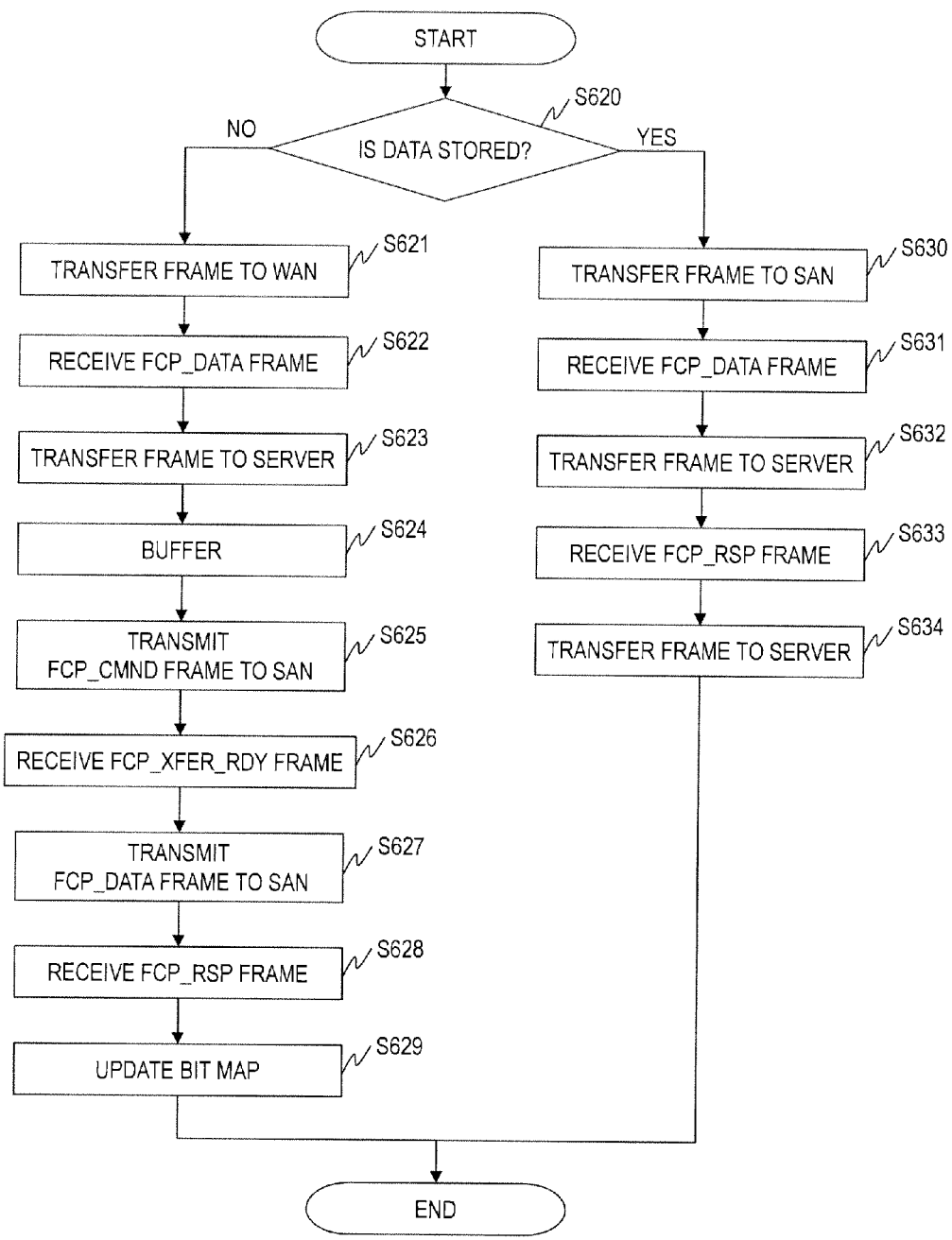

FIGS. 26 and 27 are flow charts illustrating the processing executed by the network device 100-2 according to the embodiment of this invention.

FIG. 26 illustrates a flow of the processing of the network device 100-2 illustrated in the sequence chart of FIG. 25A. FIG. 27 illustrates a flow of the processing of the network device 100-2 illustrated in the sequence chart of FIG. 25B.

First, the write processing is described with reference to FIG. 26.

In a case of receiving an FCP_CMND frame, which instructs to write a data, from the server 200-3, the network device 100-2 analyzes the FCP_CMND frame. Specifically, the following processing is executed.

First, the network device 100-2 identifies the server_IF 140 that has received the FCP_CMND frame and acquires the identifier of the identified server_IF 140. The network device 100-2 also analyzes the FCP_CMND frame to acquire the D_ID 1120 and the S_ID 1130.

The network device 100-2 searches the coupling management table 910 for an entry that matches the acquired identifier of the server_IF 140 and the acquired D_ID 1120 and S_ID 1130.

The network device 100-2 judges whether or not the state 915 of the found entry is "no". In this example, the state 915 of the entry is "destination", and hence it is judged that the state 915 of the found entry is not "no".

With the state 915 of the entry being "destination", the network device 100-2 judges that the frame needs to be transferred to the storages 300 of the migration source and the migration destination.

It should be noted that the network device 100-2 also acquires information on the CDB 1230 as a result of the analysis.

Then, the network device 100-2 transfers the FCP_CMND frame to the switch included in the SAN 800-2 (Step S601). The network device 100-2 also refers to the coupling management table 910 to judge whether or not the LUN is registered (Step S602). The processing of Step S602 is the same as that of Step S222, and therefore a description thereof is omitted.

In a case where it is judged that the LUN is registered, the network device 100 proceeds to Step S604.

In a case where it is judged that the LUN is not registered, the network device 100 stores the LUN in the LUN 914 of the corresponding entry (Step S603). It should be noted that the processing of Step S603 is the same as that of Step S223, and therefore a description thereof is omitted.

The network device 100-2 encapsulates the FCP_CMND frame to convert the FCP_CMND frame into an FCIP packet, and transfers the FCIP packet to the network device 100-1 (Step S604). Specifically, the following processing is executed.

The network device 100-2 searches the conversion table 950 for an entry having the server port 953 and the storage port 954 that match the acquired S_ID 1130 and D_ID 1120. The network device 100-2 acquires the transfer_destination_IP 959 of the found entry.

The network device 100-2 incorporates an IP address of the acquired transfer_destination_IP 959 into an IP header as the recipient and gives the IP header to the FCP_CMND frame, to thereby convert the FCP_CMND frame into the FCIP packet.

The network device 100-2 transfers the FCIP packet, which is obtained as a result of the conversion, to the network device 100-1. In this example, the FCIP packet is transferred to the IP address "200.1.2.1" of the network device 100-1.

This completes the processing of Step S604.

Then, the network device 100-2 waits for an FCP_XFER_RDY frame transmitted from each of the storage 300-3 and the storage 300-1 (Step S605).

In a case of receiving the FCP_XFER_RDY frame from each of the storage 300-3 and the storage 300-1, the network device 100-2 refers to the coupling management table 910 to transfer the FCP_XFER_RDY frame to the server 200-3 (Step S606). Specifically, the following processing is executed.

First, the network device 100-2 decapsulates an FCIP packet received from the network device 100-1 and converts the FCIP packet into the FCP_XFER_RDY frame.

The network device 100-2 analyzes the FCP_XFER_RDY frame, which is obtained as a result of the conversion, to acquire the D_ID 1120 and the S_ID 1130.

The network device 100-2 searches the coupling management table 910 for an entry having the server port 912 and the storage port 913 that match the acquired S_ID 1130 and D_ID 1120. The network device 100-2 acquires the server_IF_ID 911 of the found entry.

The network device 100-2 identifies the server_IF 140 corresponding to the acquired server_IF_ID 911 and transfers the FCP_XFER_RDY frame to the server 200-3 coupled to the server_IF 140.

This completes the processing of Step S606.

Then, in a case of receiving an FCP_DATA frame (Step S607), the network device 100-2 judges whether or not the FCP_DATA frame needs to be transferred. Specifically, the same processing as that of Step S600 is executed. In this example, the state 915 of the entry is "destination", and hence it is judged that the FCP_DATA frame needs to be transferred.

Therefore, the network device 100-2 transfers the FCP_DATA frame to the switch included in the SAN 800-2 and to the network device 100-1 (Step S608). It should be noted that the processing of Step S608 is the same as that of Steps S601 and S604, and therefore a description thereof is omitted.

The network device 100-2 waits until an FCP_RSP frame is received from each of the storage 300-3 and the storage 300-1 (Step S609).

In a case of receiving the FCP_RSP frame from each of the storage 300-3 and the storage 300-1, the network device 100-2 refers to the coupling management table 910 to transfer the FCP_RSP frame to the server 200-3 (Step S610). It should be noted that the processing of Step S610 is the same as that of Step S606, and therefore a description thereof is omitted.

The network device 100-2 updates the bit map (Step S611) and ends the processing. Specifically, the following processing is executed.

The network device 100-2 identifies an area in which the data is written, based on the LBA 1232 and the transfer_length 1233 of the CDB 1230 acquired in Step S600.

The network device 100-2 marks the bits corresponding to the blocks of the identified area.

This completes the processing of Step S611.

Next, the read processing is described with reference to FIG. 27.

In a case of receiving an FCP_CMND frame, which instructs to read a data, from the server 200-3, the network device 100-2 judges whether or not the data to be read is stored in the storage 300-3 (Step S620). Specifically, the following processing is executed.

First, the network device 100-2 identifies the server_IF 140 that has received the FCP_CMND frame and acquires an identifier of the identified server_IF 140. The network device 100-2 also analyzes the FCP_CMND frame to acquire the D_ID 1120 and the S_ID 1130.

The network device 100-2 searches the coupling management table 910 for an entry that matches the acquired identifier of the server_IF 140 and the acquired D_ID 1120 and S_ID 1130.

The network device 100-2 judges whether or not the state 915 of the found entry is "no". In this example, the state 915 of the entry is "destination", and hence it is judged that the state 915 of the found entry is not "no".

With the state 915 of the entry being "destination", the network device 100-2 judges whether or not the data is stored in the storage 300-3 of the migration destination.

First, the network device 100-2 refers to the identifier from the bitmap_ID 916 of the found entry to acquire the corresponding bit map.

The network device 100-2 acquires the LBA 1232 and the transfer_length 1233 from the FCP_CMND frame. The network device 100-2 identifies blocks from which the data is to be read, based on the acquired LBA 1232 and transfer_length 1233.

The network device 100-2 refers to the acquired bit map to judge whether or not all the bits corresponding to the identified blocks are marked.

In a case where all the corresponding bits are marked, the network device 100-2 judges that the data to be read is stored in the storage 300-3. On the other hand. In a case where one or more of the bits are not marked, the network device 100-2 judges that the data to be read is not stored in the storage 300-3.

This completes the processing of Step S620.

In a case where it is judged that the data to be read is not stored in the storage 300-3, the network device 100-2 refers to the conversion table 950 to transmit an FCIP packet, in which the FCP_CMND frame is encapsulated, to the network device 100-1 (Step S621).

This processing is performed in order to acquire the data from the storage 300-1 that was used by the VM 3 (400-3) before the migration. It should be noted that the methods of the conversion into the FCIP packet and the determination of the recipient are the same as those used in Step S604, and therefore descriptions thereof are omitted.

The network device 100-2 waits for the reception of an FCP_DATA frame transmitted from the network device 100-1.

In a case of receiving an FCIP packet in which the FCP_DATA frame is encapsulated (Step S622), the network device 100-2 decapsulates the FCIP packet to convert the FCIP packet into the FCP_DATA frame.

The network device 100-2 refers to the conversion table 950 to transfer the FCP_DATA frame, which is obtained as a result of the conversion, to the server 200-3 (Step S623). The network device 100-2 also buffers the FCP_DATA frame on the memory 120 (Step S624). It should be noted that the method of transferring the FCP_DATA frame is the same as that used in Step S606, and therefore a description thereof is omitted.

In order to reflect the read data in the storage 300-3, the network device 100-2 transmits an FCP_CMND frame, which instructs to write a data, to the storage 300-3 (Step S625). It should be noted that the network device 100-2 may identify the storage 300-3 of the transfer destination by using the result of the search in Step S624.

In a case of receiving an FCP_XFER_RDY frame from the storage 300-3 (Step S626), the network device 100-2 transmits the buffered FCP_DATA frame to the storage 300-3 (Step S627).

In a case of receiving an FCP_RSP frame from the storage 300-3 (Step S628), the network device 100-2 updates the bit map (Step S629) and ends the processing. Specifically, bits corresponding to the blocks in which the data has been reflected are updated. It should be noted that the method of identifying the bits to be updated may be the same as that used in Step S611.

In a case where it is judged in Step S620 that the data to be read is stored in the storage 300-3, the network device 100-2 refers to the coupling management table 910 to transfer the FCP_CMND frame to the storage 300-3 (Step S630).

In a case of receiving an FCP_DATA frame from the storage 300-3 (Step S631), the network device 100-2 refers to the coupling management table 910 to transfer the received FCP_DATA frame to the server 200-3 (Step S632).

In a case of receiving an FCP_RSP frame from the storage 300-3 (Step S633), the network device 100-2 refers to the coupling management table 910 to transfer the received FCP_RSP frame to the server 200-3 (Step S634) and ends the processing.

Figure 28:
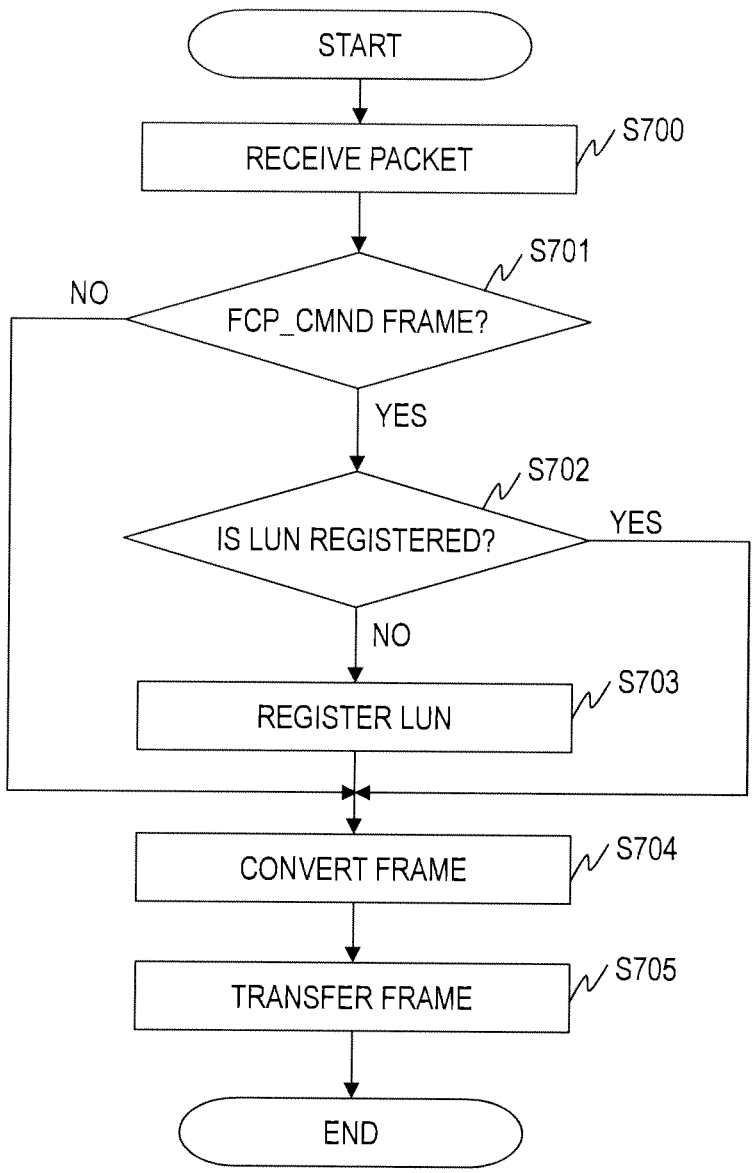
FIG. 28 is a flow chart illustrating the processing executed by the network device according to the embodiment of this invention.

FIG. 28 is a flow chart illustrating the processing executed by the network device 100-1 according to the embodiment of this invention.

FIG. 28 illustrates a flow of the processing of the network device 100-1 illustrated in the sequence charts of FIGS. 25A and 25B.

In a case of receiving an IP packet from the network device 100-2 (Step S700), the network device 100-1 judges whether or not the IP packet is an IP packet in which the FCP_CMND frame is encapsulated (Step S701).

Specifically, the network device 100-1 decapsulates the FCIP packet to convert the FCIP packet into a frame, and judges whether or not the frame obtained as a result of the conversion is the FCP_CMND frame. It should be noted that the network device 100-2 acquires an IP address of the recipient from the IP header.

In a case where it is judged that the frame is not the FCP_CMND frame, the network device 100-1 proceeds to Step S704.

In a case where it is judged that the frame is the FCP_CMND frame, the network device 100-1 judges whether or not the LUN of the transfer destination of the frame is registered in the conversion table 950 (Step S702). Specifically, the following processing is executed.

The network device 100-1 analyzes the FCP_CMND frame to acquire the S_ID 1130 and the D_ID 1120.

The network device 100-1 refers to the transfer destination 952 of the conversion table 950 and searches for an entry that matches the acquired information on the IP address, the S_ID 1130, and the D_ID 1120.

The network device 100-1 judges whether or not the LUN is stored in the LUN 958 of the found entry.

In a case of where the LUN is stored in the LUN 958 of the found entry, it is judged that the LUN of the transfer destination is registered in the conversion table 950.

This completes the processing of Step S702.

In a case where it is judged that the LUN of the transfer destination is registered in the conversion table 950, the network device 100-1 proceeds to Step S704.

In a case where it is judged that the LUN of the transfer destination is not registered in the conversion table 950, the network device 100-1 stores the LUN 1220 of the FCP_CMND frame in the LUN 958 of the corresponding entry (Step S703).

The network device 100-1 refers to the conversion table 950 to convert the FCP_CMND frame (Step S704). Specifically, the following processing is executed.

The network device 100-1 analyzes the FCP_CMND frame and refers to the transfer destination 952 of the conversion table 950 to search for the corresponding entry. It should be noted that the method of searching is the same as that used in Step S702, and therefore a description thereof is omitted.

The network device 100-1 acquires the server port 953, the storage port 954, and the LUN 955 of the corresponding entry.

The network device 100-1 converts a value of the S_ID 1130 of the FCP_CMND frame to a value of the acquired storage port 954. The network device 100-1 converts a value of the D_ID 1120 of the FCP_CMND frame to a value of the acquired server port 953. Further, the network device 100-1 converts a value of the LUN 1220 of the FCP_CMND frame to a value of the acquired LUN 955.

This completes the processing of Step S704.

The network device 100-1 transfers the converted FCP_CMND frame to the switch included in the SAN 800-1 (Step S705) and ends the processing.

Figure 29:
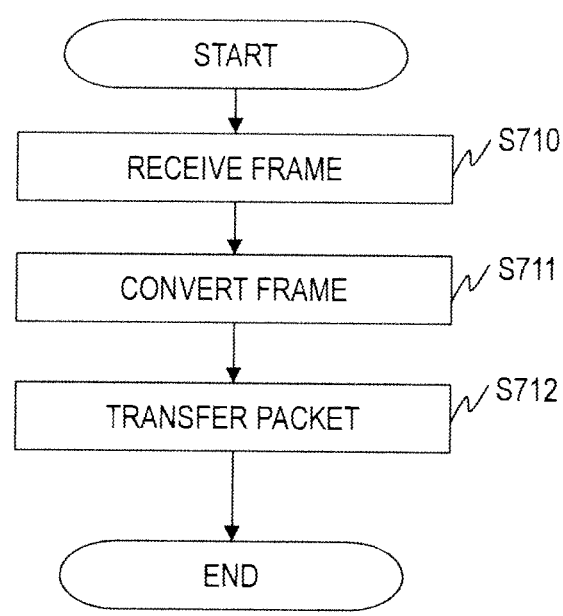
FIG. 29 is a flow chart illustrating the processing executed by the network device according to the embodiment of this invention.

FIG. 29 is a flow chart illustrating the processing executed by the network device 100-1 according to the embodiment of this invention.

FIG. 29 illustrates a flow of the processing of the network device 100-1 illustrated in the sequence charts of FIGS. 25A and 25B.

In a case of receiving a frame from the switch included in the SAN 800-1 (Step S710), the network device 100-1 analyzes the frame to judge whether or not the frame needs to be transferred. It should be noted that the judgment processing is the same as that of Step S600. In this example, it is assumed that it is found as a result of the judgment that the frame needs to be transferred.

The network device 100-1 refers to the conversion table 950 to convert the received frame into an FCIP packet (Step S711). Specifically, the following processing is executed.

The network device 100-1 analyzes the received frame to acquire the S_ID 1130 and the D_ID 1120. The network device 100-1 refers to the transfer source 951 of the conversion table 950 and searches for an entry that matches the acquired S_ID 1130 and D_ID 1120.

The network device 100-1 acquires the server port 956, the storage port 957, and the transfer_destination_IP 959 from the found entry.

The network device 100-1 stores a value of the acquired storage port 957 and the acquired server port 956 in the S_ID 1130 and the D_ID 1120 of the received frame, respectively.

Further, the network device 100-1 encapsulates the received frame to convert the received frame into an FCIP packet, and stores the acquired transfer_destination_IP 959 in the recipient address of the FCIP packet.

This completes the processing of Step S711.

The network device 100-1 transfers the FCIP packet, which is obtained as a result of the conversion, to the network device 100-2 (Step S712) and ends the processing.

(Processing Performed in the Case of Migrating VM to the Original Server)

Next, a live migration process for migrating the VM 400 back to the migration source is described.

Figure 30A:
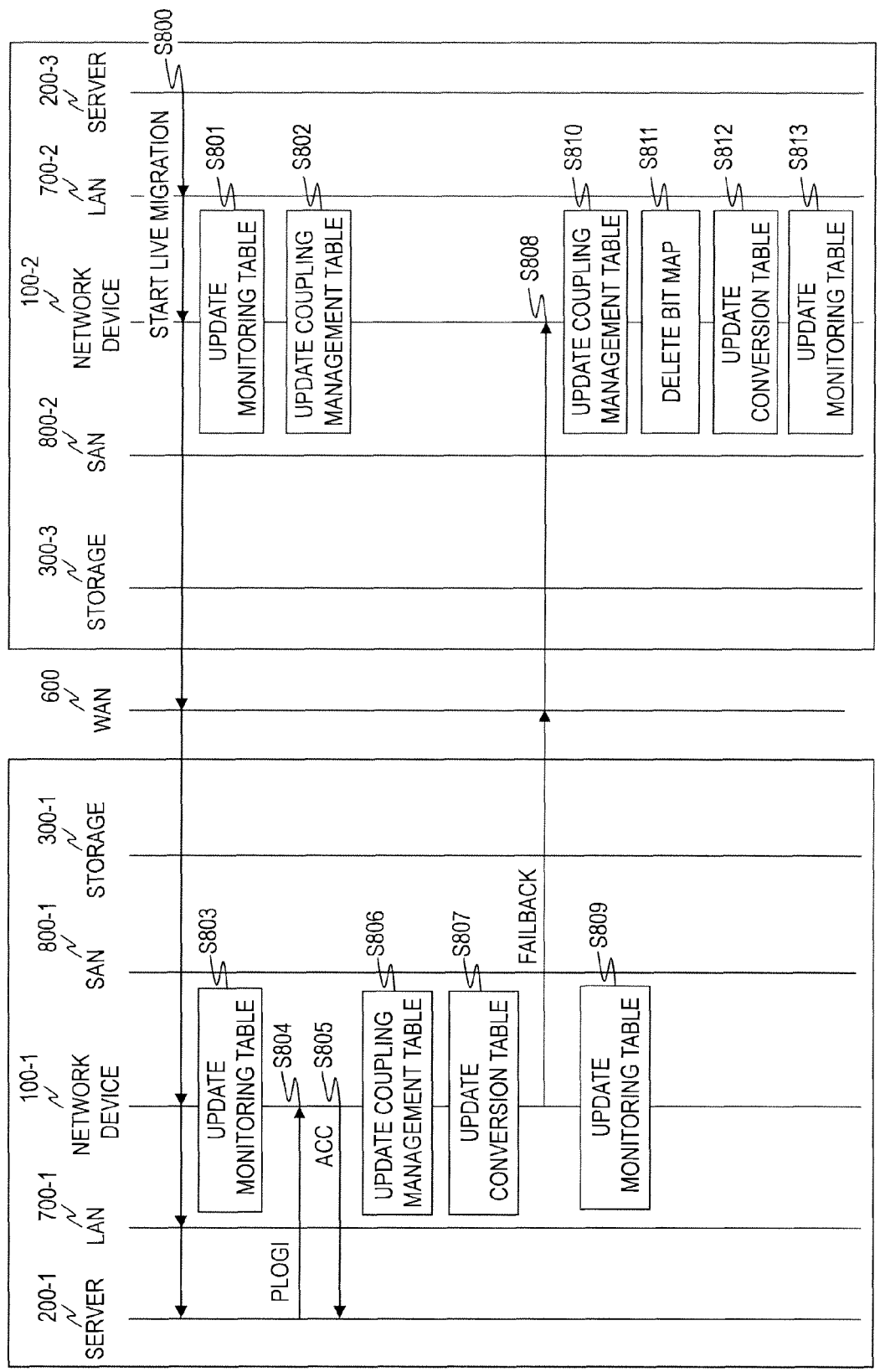
FIGS. 30A and 30B are sequence charts illustrating a flow of the live migration process, which is performed again after the execution of the live migration, according to the embodiment of this invention.
Figure 30B:
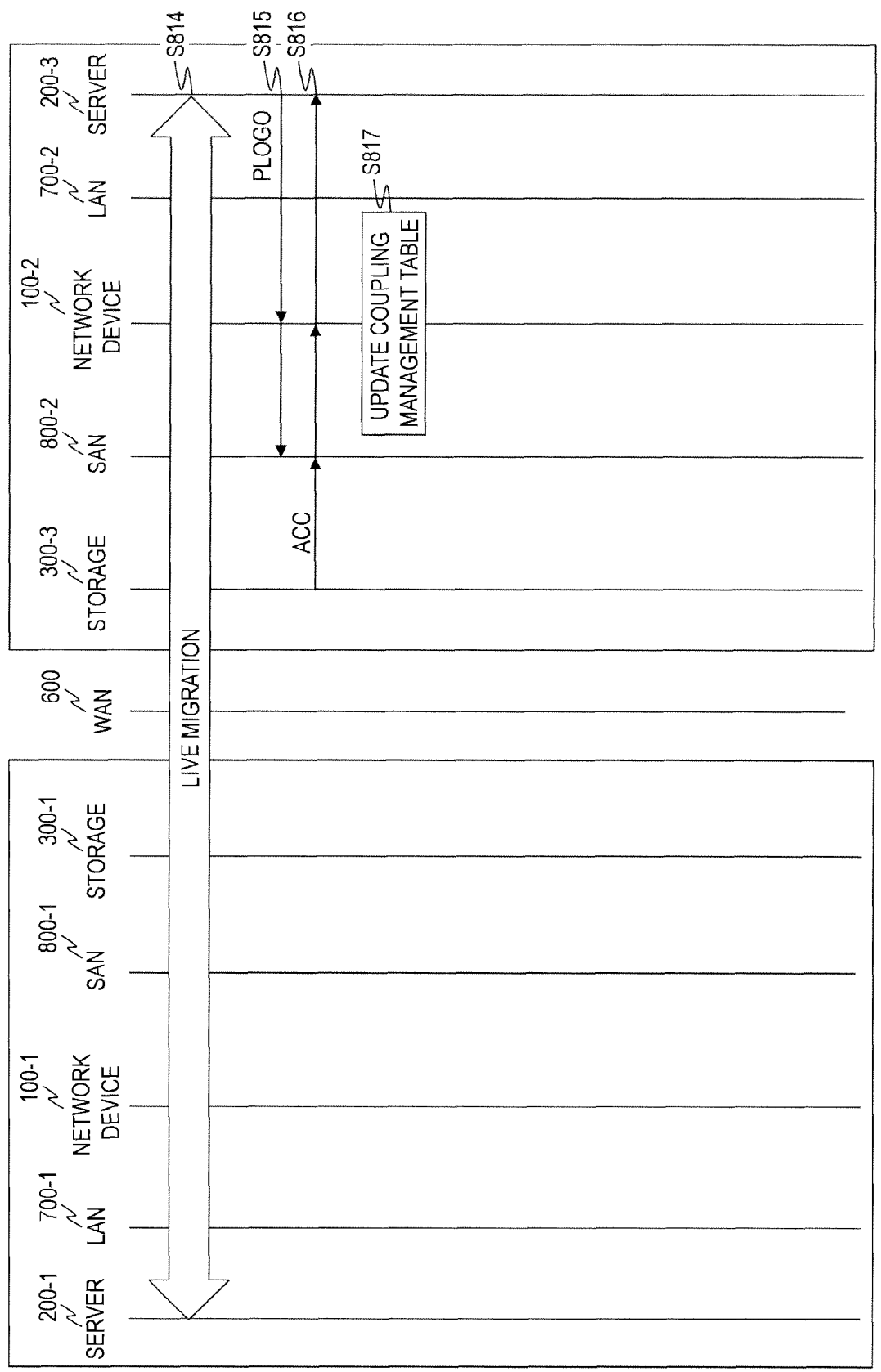

FIGS. 30A and 30B are sequence charts illustrating a flow of the live migration process, which is performed again after the execution of the live migration, according to the embodiment of this invention.

The server 200-3 transmits an IP packet including a message to start live migration of the VM 3 (400-3) to the server 200-1 (Step S800). The IP packet stores the IP address of the server 200-3 as the migration source and the IP address of the server 200-1 as the migration destination.

The network device 100-2 transfers the received IP packet to the network device 100-1 via the WAN 600. At this time, the network device 100-2 updates the monitoring table 940 and the coupling management table 910 (Steps S801 and S802). The update processing is described in detail later with reference to FIG. 31.

It should be noted that the network device 100-2 has received the IP packet from the LAN_IF 130, which leads to the recognition that the location to which the network device 100-2 belongs is the migration source.

By referring to the monitoring table 940, the network device 100-2 may discriminate the frames and IP packets transmitted/received between the servers 200 subjected to the live migration.

In a case of receiving the IP packet, the network device 100-1 transfers the IP packet to the server 200-1 of the migration destination. At this time, the network device 100-1 updates the monitoring table 940 (Step S803). The update processing is described in detail later with reference to FIG. 33.

By referring to the monitoring table 940, the network device 100-1 may discriminate the frames and IP packets transmitted/received between the servers 200 subjected to the live migration.

It should be noted that the network device 100-1 has received the IP packet from the WAN_IF 160, which leads to the recognition that the location to which the network device 100-1 belongs is the migration destination.

In a case of receiving the IP packet, the server 200-1 transmits a PLOGI frame to the network device 100-1 in order to secure a storage area to be allocated to the VM 3 (400-3) (Step S804). It should be noted that the S_ID 1130 of the PLOGI frame stores the port address that was used by the VM 3 (400-3) before the migration, and the D_ID 1120 of the PLOGI frame stores identified of the storage port that was used by the VM 3 (400-3) before the migration. The hypervisor 250 holds information on the storage 300 that was logged in before the migration, and the information is used to execute the login process.

In a case of receiving the PLOGI frame, the network device 100-1 transmits an ACC frame to the server 200-1 (Step S805). At this time, the network device 100-2 may analyze the PLOGI frame to recognize that the storage 300-1 that was allocated to the VM 3 (400-3) before the migration exists.

The network device 100-1 also updates the coupling management table 910 and the conversion table 950 (Steps S806 and S807). The update processing is described in detail later with reference to FIG. 33.

The network device 100-1 transmits an IP packet including a failback notification to the network device 100-2 via the WAN 600 (Step S808). The network device 100-1 also updates the monitoring table 940 (Step S809).

In a case of receiving the IP packet including the failback notification, the network device 100-2 updates the coupling management table 910, the conversion table 950, and the monitoring table 940 (Steps S810, S812, and S813). The update processing is described in detail later with reference to FIG. 31.

The network device 100-2 also deletes the bit map (Step S811).

Thereafter, the live migration process is executed (Step S814). In the live migration process, the information on the VM 3 (400-3) managed by the hypervisor 250 on the memory 220 is transferred to the server 200-1 of the migration destination. It should be noted that the live migration process is a known technology, and therefore a description thereof is omitted. Through this processing, the VM 3 (400-3) is migrated instantly from the server 200-3 to the server 200-1.

After completing the live migration process, the server 200-3 transmits a PLOGO frame to the storage 300-3 (Step S815). This processing is performed in order to release the storage area allocated to the VM 3 (400-3).

In a case of receiving the PLOGO frame, the network device 100-2 transmits the frame to the storage 300-3.

In a case of receiving the PLOGO frame, the storage 300-3 transmits an ACC frame to the server 200-3 (Step S816).

In a case of receiving the ACC frame, the network device 100-2 updates the coupling management table 910 (Step S817) and transfers the frame to the server 200-3.

It should be noted that the processing of Step S815, Step S816, and Step S817 is the same as that of Step S103, Step S104, and Step S105, and therefore a description thereof is omitted.

Next, the processing of the network device 100 is described.

Figure 31:
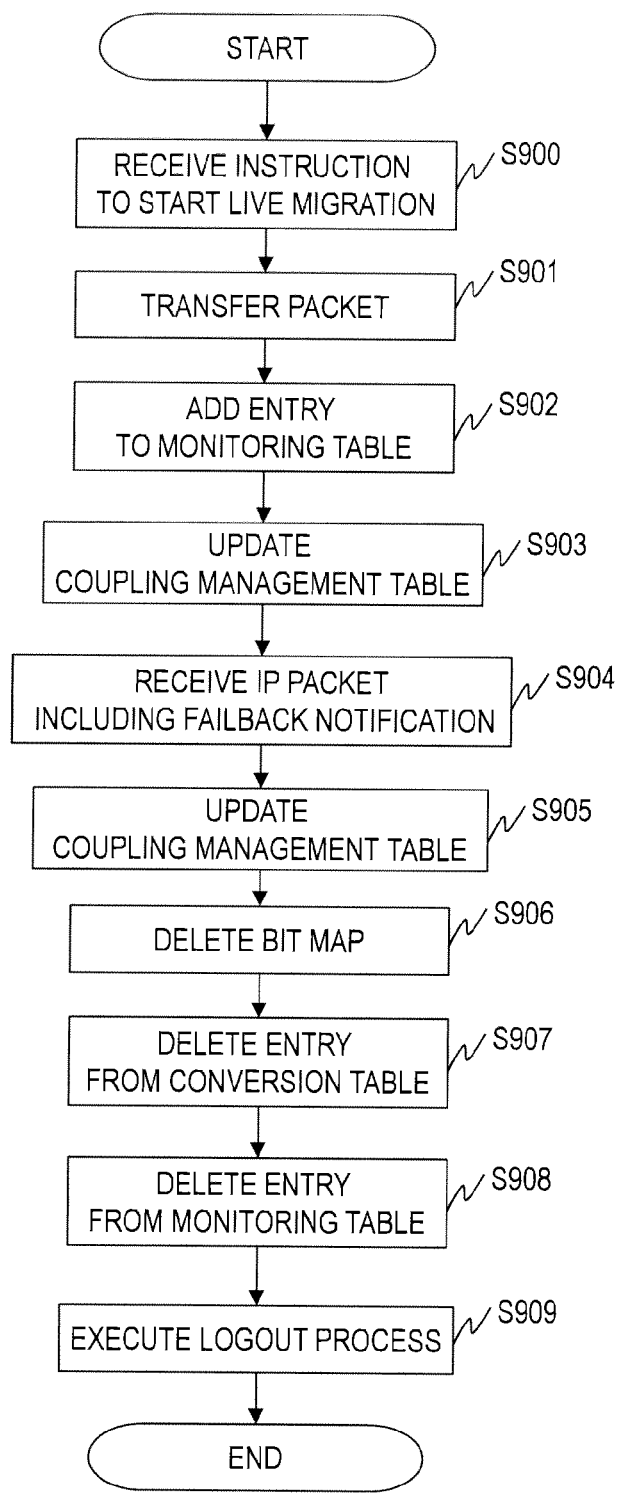
FIG. 31 is a flow chart illustrating the processing executed by the network device according to the embodiment of this invention.

FIG. 31 is a flow chart illustrating the processing executed by the network device 100-2 according to the embodiment of this invention.

In a case of receiving an IP packet including a message to start the live migration (Step S900), the network device 100-2 analyzes the IP packet. Specifically, the network device 100-2 acquires from the IP packet the IP address of the server 200-3 as the sender and the IP address of the server 200-1 as the recipient.

The network device 100-2 has received the IP packet via the LAN_IF 130, and hence it is understood that the location 500-2 to which the network device 100-2 belongs is the migration source.

The network device 100-2 transfers the received IP packet to the network device 100-1 via the WAN 600 (Step S901).

The network device 100-2 adds a new entry to the monitoring table 940 (Step S902). Specifically, the following processing is executed.

The network device 100-2 generates an entry in the monitoring table 940 and stores the acquired IP address of the server 200-3 and the acquired IP address of the server 200-1 in the source_IP 941 and the destination_IP 942 of the entry, respectively.

The network device 100-2 also stores "source" in the attribute 943 of the generated entry.

Figure 32:
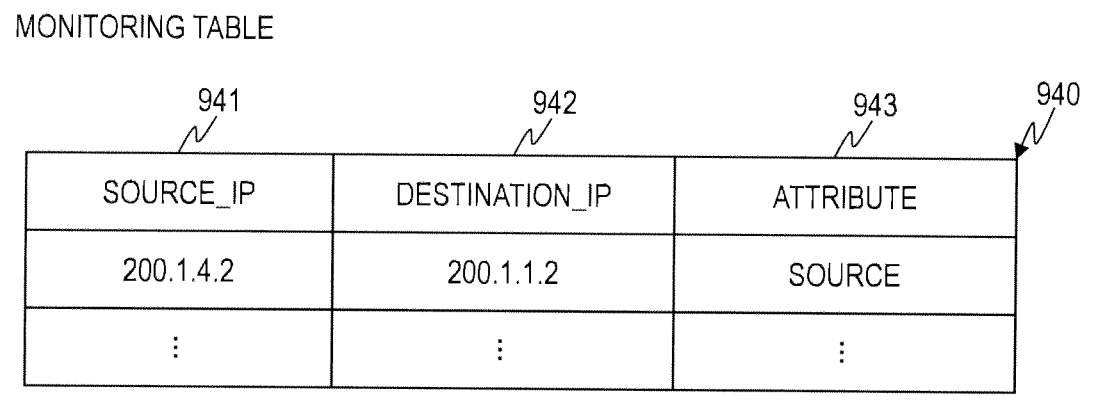

FIG. 32 illustrates a state of the monitoring table 940 after the completion of the processing of Step S902.

This completes the update processing of Step S902.

Then, the network device 100-2 updates the coupling management table 910 (Step S903). Specifically, the following processing is executed.

The network device 100-2 searches the server management table 930 for an entry having the server_IP 932 that matches the source_IP 941. The network device 100-2 acquires the server_IF_ID 931 from the found entry.

The network device 100-2 searches the coupling management table 910 for an entry having the server_IF_ID 911 that matches the acquired server_IF_ID 931.

The network device 100-2 judges whether or not the state 915 of the found entry is "no".

In a case where it is judged that the state 915 of the found entry is "no", the network device 100-2 changes the state 915 to "in progress". In a case where it is judged that the state 915 of the found entry is not "no", the network device 100-2 does not change the state 915.

This completes the update processing of Step S903.

After transferring the IP packet, the network device 100-2 waits for a response from the network device 100-1.

In a case of receiving an IP packet including a failback notification (Step S904), the network device 100-2 updates the coupling management table 910 (Step S905). Specifically, the following processing is executed.

The network device 100-2 analyzes the IP packet to acquire the IP address, the server port, the storage port, and the LUN of the recipient.

The network device 100-2 searches the server management table 930 for an entry having the server_IP 932 that matches the acquired IP address. The network device 100-2 acquires the server_IF_ID 931 from the found entry.

The network device 100-2 searches the coupling management table 910 for entries that match the acquired server_I-F_ID 931, server port, storage port, and LUN. Further, the network device 100-2 searches the found entries for an entry having the state 915 of "destination".

The network device 100-2 changes the state 915 of the found entry from "destination" to "no" and deletes the identifier from the bitmap_ID 916.

This completes the update processing of Step S905.

Then, the network device 100-2 deletes the bit map corresponding to the bitmap_ID 916 (Step S906).

The network device 100-2 deletes the corresponding entry from the conversion table 950 (Step S907). Specifically, the following processing is executed.

The network device 100-2 refers to the transfer source 951 of the conversion table 950 and searches for an entry that matches the acquired server port, storage port, and LUN.

The network device 100-2 deletes the found entry from the conversion table 950.

This completes the processing of Step S907.

Then, the network device 100-2 deletes the corresponding entry from the monitoring table 940 (Step S908). Thereafter, the network device 100-2 waits for a PLOGO frame.

In a case of receiving the PLOGO frame, the network device 100-2 executes the logout process and ends the processing (Step S909). It should be noted that the logout process is the same as the processing of FIG. 14, and therefore a description thereof is omitted.

In a case where the migration back to the migration source is executed, the data stored in the storage 300 at the migration destination is not migrated. This is because the network device 100 reflects similar update data in the storage 300 at the migration source, to thereby maintain consistency with the data stored in the storage at the migration destination. Therefore, there is no need to migrate the data at the migration destination.

Figure 33:
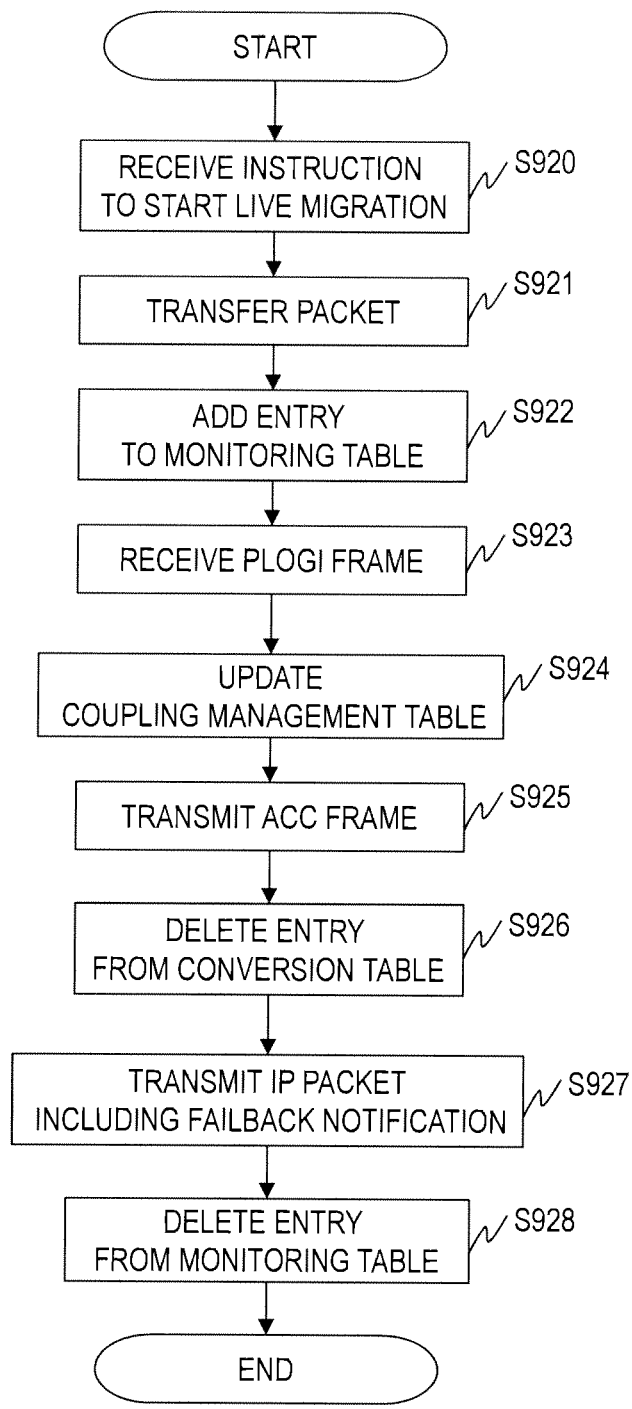
FIG. 33 is a flow chart illustrating the processing executed by the network device according to the embodiment of this invention.

FIG. 33 is a flow chart illustrating the processing executed by the network device 100-1 according to the embodiment of this invention.

In a case of receiving an IP packet including a message to start the live migration (Step S920), the network device 100-1 analyzes the IP packet. Specifically, the network device 100-1 acquires from the IP packet the IP address of the server 200-3 as the sender and the IP address of the server 200-1 as the recipient.

In this example, the network device 100-1 has received the IP packet via the WAN_IF 160, and hence it is understood that the location 500-1 to which the network device 100-1 belongs is the migration destination.

The network device 100-1 transfers the received IP packet to the server 200-1 via the LAN 700-1 (Step S921).

The network device 100-1 adds a new entry to the monitoring table 940 (Step S922). Specifically, the following processing is executed.

The network device 100-1 generates an entry in the monitoring table 940 and stores the acquired IP address of the server 200-3 and the acquired IP address of the server 200-1 in the source_IP 941 and the destination_IP 942 of the generated entry, respectively.

The network device 100-1 also stores "destination" in the attribute 943 of the generated entry.

FIG. 34 illustrates a state of the monitoring table 940 after the completion of the processing of Step S922.

This completes the update processing of Step S922. Thereafter, the network device 100-1 waits for a PLOGI frame.

In a case of receiving the PLOGI frame (Step S923), the network device 100-1 updates the coupling management table 910 (Step S924). Specifically, the following processing is executed.

The network device 100-1 analyzes the PLOGI frame to acquire the server port, the storage port, and the LUN.

The network device 100-1 searches the coupling management table 910 for an entry that matches the acquired server port, storage port, and LUN. The network device 100-1 judges whether or not the state 915 of the found entry is "no".

In a case where the state 915 of the found entry is "no", the normal login process (FIG. 12) is executed. On the other hand, in a case where it is judged that the state 915 of the entry is "source", the network device 100-1 changes the state 915 from "source" to "no" and transmits an ACC frame without performing the login process.

It should be noted that in this example, the state 915 is "source", and hence it is judged that the state 915 of the found entry is not "no".

This completes the processing of Step S924.

Then, the network device 100-1 transmits the ACC frame to the server 200-1 (Step S925). In this example, the storage 300-1 that has been allocated to the VM 3 (400-3) is used directly, and hence the PLOGI frame is not transferred to the storage 300-1. In other words, the normal login process may be omitted.

The network device 100-1 deletes the corresponding entry from the conversion table 950 (Step S926). Specifically, the following processing is executed.

The network device 100-1 refers to the conversion table 950 and searches for an entry that matches the acquired storage port and the acquired IP address of the server 200-1.

The network device 100-1 deletes the found entry from the conversion table 950.

This completes the processing of Step S926.

Then, the network device 100-1 transmits an IP packet including a failback notification to the network device 100-2 (Step S927). It should be noted that the failback notification includes the server port 912 and the storage port 913.

The network device 100-1 deletes the corresponding entry from the monitoring table 940 (Step S928) and ends the processing.

It should be noted that the order of processing steps described in this embodiment with reference to the flow charts is interchangeable as long as the consistency is maintained. For example, the processing of transferring the frame and the processing of updating the coupling management table 910 are interchangeable.

According to an embodiment of this invention, at the time of the live migration process, the network device 100 may control the VM 400 of the migration destination to access the storage 300 of the migration source, and hence the live migration process between physically distant locations may be realized.

In addition, in the live migration process of this embodiment, the data stored in the storage 300 is not migrated, and hence the VM 400 may be migrated instantly. Further, there is no need to reflect the data of the storage 300 in the storage of the migration destination in advance, and hence no load is imposed on the network.

Further, the network device 100 reflects data that has been updated in the storage 300 of the migration destination in the storage of the migration source, and hence the data consistency is maintained even after the VM 400 is migrated back to the original server 200.

Further, in response to an access request from the migrated VM 400, the control is performed so that the network device 100 may access the storage 300 of the migration source and the storage 300 of the migration destination, and hence there is no need to change the configuration of the existing hypervisor 250. In addition, the live migration process may be realized without increasing the processing load of the hypervisor 250.

MODIFIED EXAMPLE

The network device 100-1 has executed the access processing between the VM 400 and the storage 300, but the hypervisor 250 may execute similar processing. Specifically, the hypervisor 250 may include the access processing module 900, the coupling management table 910, the location coupling management table 920, the server management table 930, the monitoring table 940, and the conversion table 950.

It should be noted that the hypervisor 250 may acquire the information necessary for the access processing by making an inquiry to the network device 100, and use the information to realize the similar processing.

Alternatively, a configuration in which the network system includes a computer including the access processing module 900 may be employed. In this case, the computer including the access processing module 900 may acquire the necessary information from the network device 100 in each location, to thereby realize the similar processing.

While the present invention has been described in detail and pictorially in the accompanying drawings, the present invention is not limited to such detail but covers various obvious modifications and equivalent arrangements, which fall within the purview of the appended claims.

What is claimed is:

1. A network system, which includes a plurality of locations each including a plurality of computers, at least one storage system, and at least one network device,
the plurality of locations including a first location and a second location,
the first location including:
a plurality of computers having a first processor, a first memory coupled to the first processor, and a first interface coupled to the first processor,
a first storage system having a second controller, a plurality of storage media, and a second interface,
a first network device having a third processor, a third memory coupled to the third processor, a third interface coupled to the third processor, for coupling to the plurality of computers and the first storage system,
the second location including:
the plurality of computers having a fourth processor, a fourth memory coupled to the fourth processor, and a fourth interface coupled to the fourth processor,
a second storage system having a fifth controller, a plurality of storage media, and a fifth interface,
a second network device having a sixth processor, a sixth memory coupled to the sixth processor, a sixth interface coupled to the sixth processor, for coupling to the plurality of computers and the second storage system,
the first network device having seventh interface for coupling to the second network device,
the second network device having eighth interface for coupling to the first network device,
the first memory and the fourth memory storing a program for realizing a virtualization module for allocating a physical resource of a computer to generate at least one virtual machine and managing the at least one virtual machine,
the virtualization module including a live migration processing module for transmitting register information of the at least one virtual machine and information on a virtual memory allocated to the at least one virtual machine to another computer from a computer on which the virtualization module is executed, to migrate the at least one virtual machine between computers,
the first storage system and the second storage system configured to generate at least one storage area to be allocated to the at least one virtual machine,
the network system comprising:
an access processing module for managing accesses between the at least one virtual machine and the at least one storage area; and
coupling management information in which an identifier of the at least one virtual machine operating a computer and an identifier of port for accessing to the at least one storage area which is allocated the at least one virtual machine are associated with each other,
wherein the plurality of computers included in the first location include a first computer on which a first virtual machine, managed by a first virtualization module, is operated,
wherein the plurality of computers included in the second location include a second computer, and
wherein the access processing module is configured to:
receive a notification to start a live migration process for migrating the first virtual machine to the second computer from the first computer, from the first virtualization module;
identify a first port for accessing a first storage area, which is generated by the first storage system and is allocated to the first virtual machine operating on the first computer;
identify a second port for accessing a second storage area, which is generated by a second storage system and is allocated to the first virtual machine operating on the second computer;
acquire an address of network device to which an access request is transferred, the access request being transmitted from the first virtual machine;
analyze the notification to start the live migration process to acquire an address of the first network device, in a case of receiving the notification to start the live migration process from the first network device;
transfer the notification to start the live migration process to a second virtualization module executed on the second computer;
acquire an identifier of the first virtual machine operating on the second computer and an identifier of the second port;
add an entry to the coupling management information, in which the acquired identifier of the first virtual machine operating on the second computer and the acquired identifier of the second port are associated with each other;
give, to the added entry, state information which indicates whether or not a subject to which the access request is transferred;
acquire an identifier of the first virtual machine operating on the first computer and an identifier of the first port from the first network device;
associate the acquired identifier of the first virtual machine operating on the first computer, the acquired identifier of the first port, the acquired identifier of the first virtual machine operating on the second computer, the acquired identifier of the second port, and the address of the first network device with one another to generate conversion information;
analyze a read request to acquire the identifier of the first virtual machine operating on the second computer and the identifier of the second port, in a case receiving the read request from the first virtual machine operating on the second computer;
refer to the coupling management information to search for an entry corresponding to the acquired identifier of the first virtual machine operating on the second computer and the acquired identifier of the second port;
judge whether or not the state information indicates the subject to which the access request is transferred, of which the entry found from the coupling management information;
refer to the conversion information to search for an entry corresponding to the acquired identifier of the first virtual machine operating on the second computer and the acquired identifier of the second port, in a case where the state information indicates the subject to which the access request is transferred;
acquire the address of the first network device from the found entry from the conversion information; and
transfer the read request to the address of the first network device.

2. The network system according to claim 1, wherein the access processing module is further configured to:
generate a bit map corresponding to blocks of the second storage area, after giving the state information;
acquire the bit map, in a case where it is judged that the state information, of which the entry found from the coupling management information, indicates the subject to which the access request is transferred;
analyze the read request to identify at least one of the blocks in which data to be read is stored;
refer to the acquired bit map to judge whether or not information indicative of having been accessed is given to a bit corresponding to the identified at least one of the blocks;
transmit the read request to the second storage system in order to read the data to be read from the second storage area, in a case where the information indicative of having been accessed is given to the bit corresponding to the identified at least one of the blocks; and
transfer the read request to the first network device in order to read the data to be read from the first storage area, in a case where the information indicative of having been accessed is not given to the bit corresponding to the identified at least one of the blocks.

3. The network system according to claim 2, wherein the access processing module is further configured to:
temporarily hold a copy of the data to be read, in a case of receiving the data to be read which is read from the first storage area, from the first network device;
refer to the coupling management information to transfer the received data to be read to the first virtual machine operating on the second computer;
refer to the conversion information to transfer the copy of the data to be read, which is temporarily held, to the second storage area;
identify a bit corresponding to a block in which the data to be read, which is temporarily held, is written; and
set the information indicative of having been accessed to the identified bit of the bit map.

4. A network system, which includes a plurality of locations each including a plurality of computers, at least one storage system, and at least one network device,
the plurality of locations including a first location and a second location,
the first location including:
a plurality of computers having a first processor, a first memory coupled to the first processor, and a first interface coupled to the first processor,
a first storage system having a second controller, a plurality of storage media, and a second interface,
a first network device having a third processor, a third memory coupled to the third processor, a third interface coupled to the third processor, for coupling to the plurality of computers and the first storage system,
the second location including:
a plurality of computers having a fourth processor, a fourth memory coupled to the fourth processor, and a fourth interface coupled to the fourth processor,
a second storage system having a fifth controller, a plurality of storage media, and a fifth interface,
a second network device having a sixth processor, a sixth memory coupled to the sixth processor, a sixth interface coupled to the sixth processor, for coupling to the plurality of computers and the second storage system,
the first network device having seventh interface for coupling to the second network device,
the second network device having eighth interface for coupling to the first network device,
the first memory and the fourth memory storing a program for realizing a virtualization module for allocating a physical resource of a computer to generate at least one virtual machine and managing the at least one virtual machine,
the virtualization module including a live migration processing module for transmitting register information of the at least one virtual machine and information on a virtual memory allocated to the at least one virtual machine to another computer from a computer on which the virtualization module is executed, to migrate the at least one virtual machine between computers,
the first storage system and the second storage system generating at least one storage area to be allocated to the at least one virtual machine,
the network system comprising:
an access processing module for managing accesses between the at least one virtual machine and the at least one storage area; and
coupling management information in which an identifier of the at least one virtual machine operating a computer and an identifier of port for accessing to the at least one storage area which is allocated the at least one virtual machine are associated with each other,
wherein the plurality of computers included in the first location include a first computer on which a first virtual machine, managed by a first virtualization module, is operated,
wherein the plurality of computers included in the second location include a second computer, and
wherein the access processing module is configured to:
receive a notification to start a live migration process for migrating the first virtual machine to the second computer from the first computer, from the first virtualization module;
analyze the notification to start the live migration process to acquire an address of the first network device, in a case of receiving the notification to start the live migration process from the first network device;
transfer the notification to start the live migration process to a second virtualization module executed on the second computer;
identify a first port for accessing a first storage area, which is generated by the first storage system and is allocated to the first virtual machine operating on the first computer;
identify a second port for accessing a second storage area, which is generated by the second storage system and is allocated to the first virtual machine operating on the second computer;

acquire an address of a network device to which an access request is transferred, the access request being transmitted from the first virtual machine;

acquire an identifier of the first virtual machine operating on the second computer and an identifier of the second port;

add an entry to the coupling management information, in which the acquired identifier of the first virtual machine operating on the second computer and the acquired identifier of the second port are associated with each other;

give, to the added entry, state information which indicates whether or not a subject to which the access request is transferred;

acquire an identifier of the first virtual machine operating on the first computer and an identifier of the first port from the first network device;

associate the acquired identifier of the first virtual machine operating on the first computer, the acquired identifier of the first port, the acquired identifier of the first virtual machine operating on the second computer, the acquired identifier of the second port, and the address of the first network device with one another to generate conversion information;

analyze a write request to acquire the identifier of the first virtual machine operating on the second computer and the identifier of the second port, in a case of receiving the write request from the first virtual machine operating on the second computer;

refer to the coupling management information to search for an entry corresponding to the acquired identifier of the first virtual machine operating on the second computer and the acquired identifier of the second port;

judge whether or not the state information indicates the subject to which the access request is transferred, of which the entry found from the coupling management information;

refer to the conversion information to search for an entry corresponding to the acquired identifier of the first virtual machine operating on the second computer and the acquired identifier of the second port, in a case where the state information indicates the subject to which the access request is transferred;

acquire the address of the first network device from the found entry from the conversion information;

transmit the write request to the second storage system in order to write data to be written in the second storage area; and transfer the write request to the address of the first network device in order to write the data to be written in the first storage area.

5. The network system according to claim 4, wherein the access processing module is configured to:

transfer the notification to start the live migration process to the second network device, in a case of receiving the notification to start the live migration process from the first virtualization module;

refer to the coupling management information to search for an entry in which the identifier of the first virtual machine operating on the first computer and the identifier of the first port are associated with each other;

give, to the found entry, the state information indicative of the subject to which the access request is transferred;

receive recipient information transmitted from the second network device;

analyze the received recipient information to acquire an address of the second network device, the identifier of the first virtual machine operating on the second computer, and the identifier of the second port;

analyze a logout request to acquire the identifier of the first virtual machine operating on the first computer, and the identifier of the first port, in a case of receiving the logout request for the first storage area from the first virtualization module;

transmit to the first virtualization module a response indicating that the logout request has been received; and add an entry to the conversion information, in which the identifier of the first virtual machine operating on the first computer, and the identifier of the first port for, the identifier of the first virtual machine operating on the second computer, the identifier of the second port, and the address of the second network device are associated with one another.

6. The network system according to claim 5, wherein the access processing module is further configured to:

analyze a read request to acquire the identifier of the first virtual machine operating on the second computer, the identifier of the second port, and the address of the second network device, in a case of receiving the read request from the second network device;

refer to the conversion information to search for an entry corresponding to the acquired identifier of the first virtual machine operating on the second computer, the acquired identifier of the second port, and the acquired address of the second network device;

acquire the identifier of the first virtual machine operating on the first computer and the identifier of the first port from the found entry; and transfer the read request including the identifier of the first virtual machine operating on the first computer and the identifier of the first port to the first storage system.

7. The network system according to claim 6, wherein the access processing module is further configured to:

analyze a notification to start a live migration process, for migrating the first virtual machine operating on the second computer to the first computer, to acquire the address of the second network device, in a case of receiving the notification to start a live migration process from the second network device;

transfer the notification to start the live migration process to the first virtualization module;

analyze a login request to acquire the identifier of the first port and the identifier of the first virtual machine operating on the first computer, in a case of receiving the login request for the first storage area from the first virtualization module;

refer to the coupling management information to search for an entry corresponding to the acquired identifier of the first port and the acquired identifier of the first virtual machine operating on the first computer;

judge whether or not the state information indicates the subject to which the access request is transferred, of which the found entry from the coupling management information;

transmit to the first virtualization module a response indicating that the login request has been received, in a case where the state information indicates the subject to which the access request is transferred, of which the found entry from the coupling management information;

delete the state information given to the found entry from the coupling management information;

refer to the conversion information to search for an entry corresponding to the acquired address of the second network device and the acquired identifier of the first port; and delete the found entry from the conversion information.

* * * * *